(12) United States Patent
Johnson et al.

(10) Patent No.: US 10,489,982 B2
(45) Date of Patent: Nov. 26, 2019

(54) DEVICE, SYSTEM AND METHOD FOR CONTROLLING A DISPLAY SCREEN USING A KNOWLEDGE GRAPH

(71) Applicant: MOTOROLA SOLUTIONS, INC., Chicago, IL (US)

(72) Inventors: Eric Johnson, Chicago, IL (US); Randy L. Ekl, Downers Grove, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/938,353

(22) Filed: Mar. 28, 2018

(65) Prior Publication Data

US 2019/0304190 A1    Oct. 3, 2019

(51) Int. Cl.
| | |
|---|---|
| *G02B 27/01* | (2006.01) |
| *G06T 19/00* | (2011.01) |
| *G09G 5/00* | (2006.01) |
| *G09G 5/377* | (2006.01) |
| *G06F 3/01* | (2006.01) |

(Continued)

(52) U.S. Cl.
CPC .......... *G06T 19/006* (2013.01); *G02B 27/017* (2013.01); *G06F 3/011* (2013.01); *G06F 3/013* (2013.01); *G06F 3/017* (2013.01); *G06F 3/04815* (2013.01); *G06F 3/167* (2013.01); *G02B 2027/0178* (2013.01)

(58) Field of Classification Search
CPC ....... G06T 19/006; G06T 13/20; G06F 3/011; G06F 3/013; G06F 3/017; G06F 3/04815; G06F 3/167; G02B 2027/0178

USPC ......................................................... 345/633
See application file for complete search history.

(56) References Cited

U.S. PATENT DOCUMENTS

| | | |
|---|---|---|
| 8,102,334 B2 | 1/2012 | Brown et al. |
| 9,129,430 B2 | 9/2015 | Salter et al. |
| 2011/0044498 A1 | 2/2011 | Cobb et al. |

(Continued)

OTHER PUBLICATIONS

Jun Yi, "User Interface Design and Forensic Analysis for Diorama, Decision Support System for Mass Casualty Incidents", Masters Theses, University of Massachusetts Amherst, Sep. 2015, pp. 1-71 (Year: 2015).*

(Continued)

*Primary Examiner* — Jin Cheng Wang

(74) *Attorney, Agent, or Firm* — Perry + Currier, Inc.

(57) ABSTRACT

A device, system and method for controlling a display screen using a knowledge graph is provided. A knowledge graph defines relationships between a plurality of persons-objects-entities (POEs) of interest. A controller selects one or more field-of-view POEs of interest that are related to the work assignment and are located in a field-of-view of a display screen. The controller extracts, from the knowledge graph: associated relationships between the one or more field-of-view POEs of interest and/or one or more field-of-view POEs of interest located out of the field-of-view of the display screen. The controller generates a graphical representation including indications of: the one or more field-of-view POEs of interest and the one or more out-of-field-of-view POEs of interest, and relationships therebetween. The controller renders the graphical representation within the field-of-view of the display screen.

20 Claims, 10 Drawing Sheets

(51) Int. Cl.
*G06F 3/0481* (2013.01)
*G06F 3/16* (2006.01)

(56) References Cited

U.S. PATENT DOCUMENTS

| | | | |
|---|---|---|---|
| 2014/0063058 A1 | 3/2014 | Fialho et al. | |
| 2015/0325054 A1* | 11/2015 | Salter | G06F 3/013 345/633 |
| 2015/0356781 A1 | 12/2015 | Miller | |
| 2016/0210784 A1 | 7/2016 | Ramsby | |

OTHER PUBLICATIONS

Stefan Gladisch, et al., "Navigation Recommendations for Exploring Hierarchical Graphs", Proc. of Symposium on Visual Computing, Springer, 2013, doi: 10.1007/978-642-41939-3_4, pp. 36-47 (Year: 2013).*

M. Frisch, et. al., "Visualizing off-screen elements of node-link diagrams", Information Visualization, vol. 12, No. 2, May 9, 2016, pp. 133-162 (Year: 2016).*

S. Burigat, et al., "Visualizing Locations of Off-Screen Objects on Mobile Devices: A Comparative Evaluation of Three Approaches", MobileHCI '06, Sep. 12-15, 2006, Helsinki, Finland, pp. 239-246 (Year: 2006).*

S. Burigat, "Navigation techniques for small-screen devices", an evaluation on maps and web pages, Int. J. Human-Computer Studies, vol. 66, 2008, pp. 78-97 (Year: 2008).*

Y-T Lin, et al., "Outside-In: Visualizing Out-of-Sight Regions-of-Interest in a 360 Video Using Spatial Picture-in-Picture Previews", UIST 2017, Oct. 22-25, 2017, Quebec City, Canada, pp. 255-265 (Year: 2017).*

Siu, Teresa, et. al, "SidebARs: Improving awareness of off-screen elements in mobile augmented reality", Pontificia Universidad Catolica, Santiago, Chile, Conference paper, Nov. 2013, pp. 1-6, downloaded from https://www.researchgate.net/publication/262221381_SidebARs_Improving_awareness_of_off-screen_elements_in_mobile_augmented_reality.

GeoTime by Uncharted_Call Recod Mapping & Cell Site Analysis, downloaded on Mar. 23, 2018.

* cited by examiner

US 10,489,982 B2

DEVICE, SYSTEM AND METHOD FOR CONTROLLING A DISPLAY SCREEN USING A KNOWLEDGE GRAPH

BACKGROUND OF THE INVENTION

The display screen on a mobile communication device utilized by first responders (e.g. police officers) in the field is generally small, for example compared to the display screen of a personal computer. Hence, within an augmented reality, virtual reality and/or enhanced reality and/or mixed reality view, only a subset of relevant information and/or images may be rendered, which may lead to inefficient use of technical and/or processing resources, for example as the display screen is moved to render consecutive fields-of-view. This becomes particularly problematic for first responders utilizing augmented reality, virtual reality and/or enhanced reality and/or mixed reality view to assist in investigating a public safety incident.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
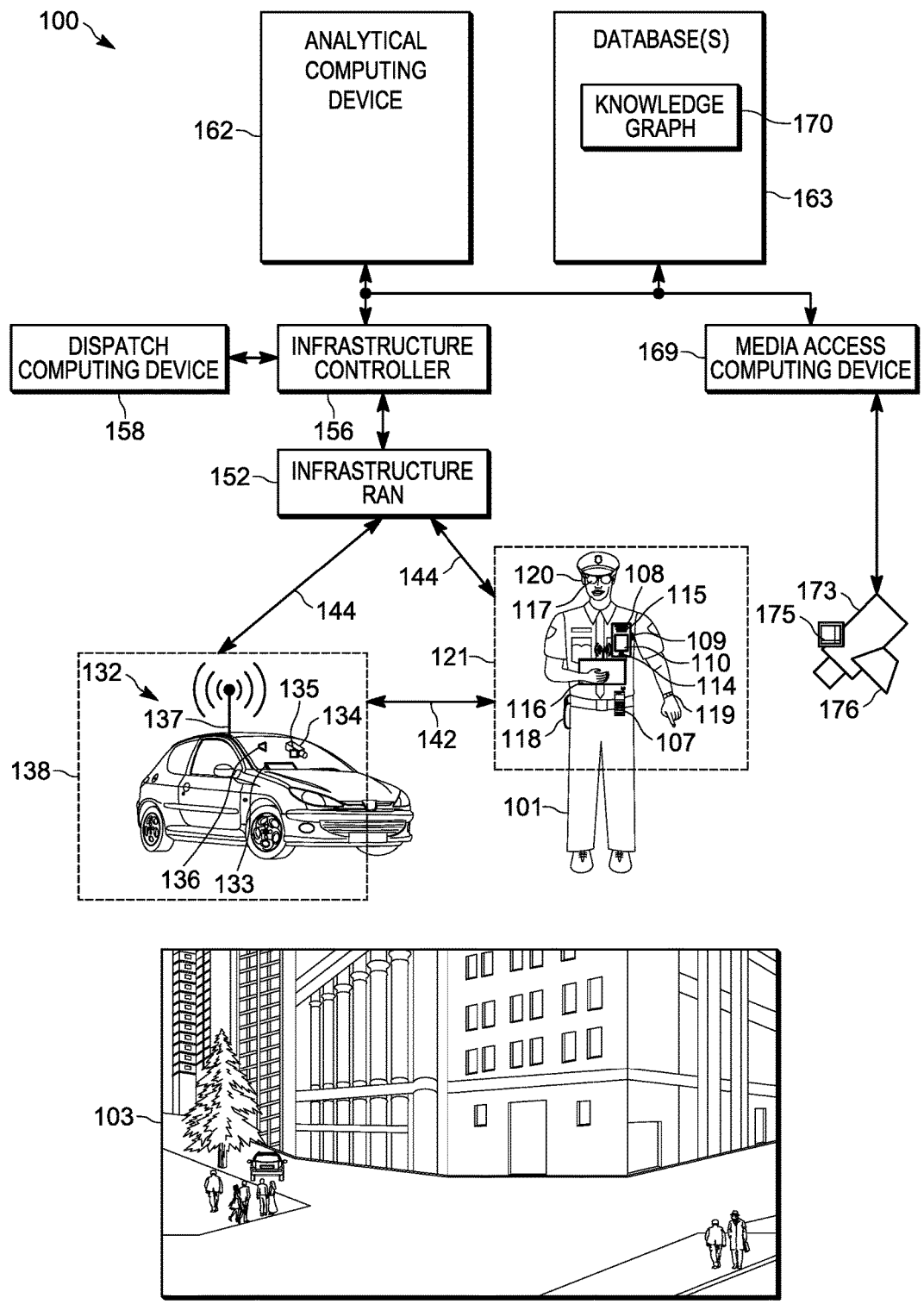
FIG. 1 is a system for controlling a display screen using a knowledge graph in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a system comprising: a memory configured to store a knowledge graph that defines relationships between a plurality of persons-objects-entities (POEs) of interest; a display screen; a controller having access to the memory, and the controller communicatively to the display screen, the controller configured to: receive a work assignment associated with the display screen; select one or more field-of-view POEs of interest, from the plurality of POEs of interest, that are related to the work assignment and are located in a field-of-view of the display screen; extract, from the knowledge graph: associated relationships between the one or more field-of-view POEs of interest; associated relationships between the one or more field-of-view POEs of interest and one or more out-of-field-of-view POEs of interest, the one or more out-of-field-of-view POEs of interest selected from the plurality of POEs of interest, are related to the work assignment, and are located out of the field-of-view of the display screen; generate a graphical representation including: a first indication of the one or more field-of-view POEs of interest; a second indication of the associated relationships between the one or more field-of-view POEs of interest; a third indication of the one or more out-of-field-of-view POEs of interest; and a fourth indication of the associated relationships between the one or more field-of-view POEs of interest and the one or more out-of-field-of-view POEs of interest; and render, at the display screen, the graphical representation within the field-of-view of the display screen.

Another aspect of the specification provides a method comprising: receiving, at a controller, a work assignment associated with a display screen; selecting, at the controller, one or more field-of-view POEs of interest, from the plurality of POEs of interest, that are related to the work assignment and are located in a field-of-view of the display screen, the controller having access to a memory configured to store at least a subset of a knowledge graph that defines relationships between a plurality of persons-objects-entities (POEs) of interest; extracting, using the controller, from at least the subset of the knowledge graph: associated relationships between the one or more field-of-view POEs of interest; associated relationships between the one or more field-of-view POEs of interest and one or more out-of-field-of-view POEs of interest, the one or more out-of-field-of-view POEs of interest selected from the plurality of POEs of interest, are related to the work assignment, and are located out of the field-of-view of the display screen; generating, using the controller, a graphical representation including: a first indication of the one or more field-of-view POEs of interest; a second indication of the associated relationships between the one or more field-of-view POEs of interest; a third indication of the one or more out-of-field-of-view POEs of interest; and a fourth indication of the associated relationships between the one or more field-of-view POEs of interest and the one or more out-of-field-of-view POEs of interest; and rendering, using the controller, at the display screen, the graphical representation within the field-of-view of the display screen.

Yet another aspect of the specification provides a device comprising: a memory configured to store at least a subset of a knowledge graph that defines relationships between a plurality of persons-objects-entities (POEs) of interest; a display screen; a communication unit; and a controller communicatively coupled to the memory, display screen, and the communication unit, the controller configured to: receive, via the communication unit, a work assignment associated with the display screen; select one or more field-of-view POEs of interest, from the plurality of POEs of interest, that are related to the work assignment and are located in a field-of-view of the display screen; extract, from at least the subset of the knowledge graph: associated relationships between the one or more field-of-view POEs of interest; associated relationships between the one or more field-of-view POEs of interest and one or more out-of-field-of-view POEs of interest, the one or more out-of-field-of-view POEs of interest selected from the plurality of POEs of interest, are related to the work assignment, and are located out of the field-of-view of the display screen; generate a graphical representation including: a first indication of the one or more field-of-view POEs of interest; a second indication of the associated relationships between the one or more field-of-view POEs of interest; a third indication of the one or more out-of-field-of-view POEs of interest; and a fourth indication of the associated relationships between the one or more field-of-view POEs of interest and the one or more out-of-field-of-view POEs of interest; and render, at the display screen, the graphical representation within the field-of-view of the display screen.

The display screen on a mobile communication device utilized by first responders (e.g. police officers) in the field is generally small, for example compared to the display screen of a personal computer. Hence, within an augmented reality, virtual reality and/or enhanced reality and/or mixed reality view, only a subset of relevant information and/or images may be rendered, which may lead to inefficient use of technical and/or processing resources, for example as the display screen is moved to render consecutive fields-of-view. This becomes particularly problematic for first responders utilizing augmented reality, virtual reality and/or enhanced reality and/or mixed reality views to assist in investigating a public safety incident as the size of the display screen being utilized may force the first responder to search for persons-objects-entities of interest by rapidly scanning an incident scene using the augmented reality, virtual reality and/or enhanced reality and/or mixed reality view; such rapid scanning may be beyond the technical capabilities and/or processing speeds and/or bandwidth speeds of a device attempting to both capture and process images of the incident scene.

Hence, attention is directed to FIG. 1, which depicts a system 100 for controlling a display screen using a knowledge graph. For example, as depicted, one or more computing devices of the system 100 may control a display screen 103 of one or more devices of a user 101, such as a police officer, a first responder, and the like, using a knowledge graph. As will be explained in more detail below, nodes of the knowledge graph represent persons-objects-entities of interest, and lines between the nodes represent relationships therebetween. As will be explained in further detail below, or more computing devices of the system 100 may control the display screen 103 to include indications of persons-objects-entities of interest as represented by nodes of the knowledge graph, including persons-objects-entities of interest that are in the field-of-view of the display screen 103, and out of the field-of-view of the display screen, including indications of relationships therebetween.

As depicted, the display screen 103 comprises a display screen of a device associated with the user 101, the display screen 103 providing images that are in a field-of-view of (for example) one or more cameras of the devices associated with the user 101. Alternatively, the display screen 103 may be transparent and the field-of-view depicted in the display screen 103 represents a field-of-view of objects etc. visible through the transparent display screen 103' for example the display screen 103 may be a component of a heads-up display, smart glasses, and the like; such transparent display screens of heads-up displays, smart glasses and the like are generally used in conjunction with one or more cameras having a same and/or similar field-of-view as the transparent display screen, as well as orientation and/or environmental sensors, all within the scope of the present specification.

Regardless, the display screen 103 depicted in FIG. 1 shows a plurality of persons-objects-entities (POEs) of interest including, but not limited to, people, objects, buildings, vehicles, business, organizations and/or any object and/or person and/or entity which may be associated with, for example, a work assignment of the user 101. Entities (such as business and the like) may be represented by buildings and/or other physical objects in the field-of-view (e.g. vehicles, carts, and the like). Furthermore, such work assignments may include, but are not limited to, incident assignments (e.g. for an incident occurring at the location of the user), shift assignments, patrol assignments, and the like.

The system 100 is next described in further detail. As depicted, the system 100 includes one or more devices associated with and/or assigned to a user 101, for example that the user 101 may wear. The one or more devices associated with and/or assigned to the user 101 may include one device, such as a primary battery-powered portable radio 107 (including, but not limited to, a smartphone, and the like), used for narrowband and/or broadband direct-mode or infrastructure communications, or more than one device. Such devices may be referred to as edge devices as they are located not in the "cloud" but at the "edge" of a network and/or the "cloud". As such, the user 101 may alternatively be referred to as an operator of an edge device.

Such devices may further include, a battery-powered radio speaker microphone (RSM) video capture device 108 (which includes a push-to-talk (PTT) switch 109, a display screen 110 and a video camera 114 and a microphone 115 (which is assumed to be a component of a speaker/microphone assembly). As depicted, the one or more devices assigned to the user 101 includes a laptop 116 which may include an integrated video camera and/or microphone and/or speaker and used for data applications including, but not limited to, incident support applications, incident management applications, computer aided dispatch applications and the like. As depicted the one or more devices assigned to the user 101 includes smart glasses 117 (e.g. which may be augmented reality, virtual reality and/or enhanced reality and/or mixed reality glasses and which may include an integrated video camera and/or microphone and/or speaker), a sensor-enabled holster 118, and/or a biometric sensor wristband 119 and/or a headphone 120.

The display screen 103 may generally comprise a display screen of one or more of the devices worn by the user 101 including, but not limited to, a display screen of the portable radio 107, the display screen 110 of the video capture device 108, a display screen of the laptop 116, a display screen of the smart glasses 117, and the like.

The portable radio 107, the RSM video capture device 108, the laptop 116, smart glasses 117, the sensor-enabled holster 118, and/or the biometric sensor wristband 119 and/or the headphone 120 may form a personal area network (PAN) 121 of the user 101 via corresponding short-range PAN transceivers, which may be based on a Bluetooth™, Zigbee™, WiFi (including, but not limited to, WiFi Direct™) or other short-range wireless protocol having a transmission range on the order of meters, tens of meters, or hundreds of meters.

While not depicted, the personal area network 121 may include other types of devices that include sensors, such as a man-down sensor and/or a sensor equipped vest worn by the user 101 which may be configured to detect when the vest is impacted and/or pierced.

Although FIG. 1 illustrates the user 101 with a respective one or more devices assigned to the user 101, in other embodiments, the user 101 may include additional sets of same or similar devices, and additional persons and/or users and/or first responders may be present, with respective additional sets of same or similar devices (wherein communication devices of the user 101 and at least one other user may form a talkgroup of related users).

The system 100 may also include a vehicle 132 associated with the user 101 having an integrated mobile communication device 133, an associated vehicular video camera 134, and/or an associated microphone 135 (which may be a component of the video camera 134 or a component separate from the video camera 134), a speaker 136 and a coupled vehicular transceiver 137 which may form a vehicle area network (VAN) 138. The devices of the VAN 138 may also be assigned to and/or associated with the user 101, and furthermore the VAN 138 may be a component of the PAN 121, or vice versa, and/or the VAN 138 and the PAN 121 may be in communication via a flat and/or mesh network topology. Other components of the VAN 138 may include, but are not limited to, an ignition of the vehicle 132, locks of the vehicle 132, and the like.

Alternatively, the display screen 103 may generally comprise a display screen of one or more of the devices of the vehicle 132 including, but not limited to, a display screen of the mobile communication device 133, and the like; for example, the display screen 103 may comprise a heads-up display screen and/or a projection display screen integrated with a windshield of the vehicle and controlled by the mobile communication device 133.

Hence, the display screen 103 may comprises one or more of: a mobile communication display screen; and a heads-up display screen.

Although FIG. 1 illustrates only a single vehicle 132 with a single mobile communication device 133, respective single vehicular video camera 134 and/or microphone 135, and single coupled vehicular transceiver 137, in other embodiments, the vehicle 132 may include additional same or similar mobile communication devices, video cameras, microphones, speakers, and/or transceivers, and additional vehicles may be present with respective additional sets of mobile communication devices, video cameras, speakers, microphones, and/or transceivers.

Each of the portable radio 107, the RSM video capture device 108, the laptop 116, and/or the PAN 121 and the vehicular mobile communication device 133 and/or the VAN 138 may be configured for directly wirelessly communicating via direct-mode wireless link(s) 142, and/or may be configured for wirelessly communicating over respective wireless link(s) 144 via a wireless infrastructure radio access network (RAN) 152 (described in more detail below) and via corresponding transceiver circuits. These devices may be referred to as communication devices and are configured to receive inputs associated with the user 101 and/or provide outputs to the user 101 in addition to communicating information to and from other communication devices and the infrastructure RAN 152.

The portable radio 107, may be any communication device used for infrastructure RAN or direct-mode media (e.g., voice, audio, video, etc.) communication via a long-range wireless transmitter and/or transceiver that has a transmitter transmit range on the order of miles, e.g., 0.5-50 miles, or 3-20 miles (i.e., long-range in comparison to a short-range transmitter such as a Bluetooth™ Zigbee™, or NFC (near field communication) transmitter) with other communication devices and/or an infrastructure RAN. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long-range transmitter may implement a Long-Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long-range transmitter may implement a Wi-Fi protocol, for example in accordance with an IEEE 802.11 standard (e.g., 802.11a, 802.11b, 802.11g) or a WiMAX (Worldwide Interoperability for Microwave Access) protocol, for example operating in accordance with an IEEE 802.16 standard.

In the example of FIG. 1, the portable radio 107 may form the hub of communication connectivity for the user 101, through which other accessory devices, such as a biometric sensor (for example, the biometric sensor wristband 119), an activity tracker, a weapon status sensor (for example, the sensor-enabled holster 118), a heads-up-display (for example, the smart glasses 117), the RSM video capture device 108, and/or the laptop 116 and/or the headphone 120 may be communicatively coupled. In other words, the portable radio 107 may form the hub of the PAN 121.

In order to communicate with and exchange video, audio, and other media and communications with the RSM video capture device 108, laptop 116, and/or smart glasses 117 and/or headphone 120, the portable radio 107 may contain one or more physical electronic ports (such as a USB (Universal Serial Bus) port, an Ethernet port, an audio jack, etc.) for direct electronic coupling with the RSM video capture device 108, laptop 116, and/or smart glasses 117 and/or headphone 120. In some embodiments, the portable radio 107 may contain a short-range transmitter (i.e., short-range in comparison to the long-range transmitter such as a LMR or broadband transmitter) and/or transceiver for wirelessly coupling with the RSM video capture device 108, laptop 116, and/or smart glasses 117 and/or headphone 120. The short-range transmitter may be a Bluetooth™, Zigbee™, WiFi Direct™, or NFC transmitter having a transmit range on the order of 0.01-100 meters, or 0.1-10 meters. In other embodiments, the RSM video capture device 108, the laptop 116, and/or the smart glasses 117 and/or headphone 120 may contain their own long-range transceivers and may communicate with one another and/or with the infrastructure RAN 152 or vehicular transceiver 137 directly without passing through portable radio 107.

The RSM video capture device 108 provides voice functionality features similar to a traditional RSM, including one or more of acting as a remote microphone (e.g. via the microphone 115) that is closer to the mouth of the user 101, providing a remote speaker (e.g. integrated with the microphone 115) allowing playback of audio closer to the ear of the user 101, and including the PTT switch 109 or other type of PTT input. The voice and/or audio recorded at the remote microphone 115 may be provided to the portable radio 107 for storage and/or analysis or for further transmission to other mobile communication devices or the infrastructure RAN 152, or may be directly transmitted by the RSM video capture device 108 to other communication devices or to the infrastructure RAN 152. The voice and/or audio played back at the remote speaker may be received from the portable radio 107 or received directly from one or more other communication devices or the infrastructure RAN 152. The RSM video capture device 108 may include the separate physical PTT switch 109 that functions, in cooperation with the portable radio 107 or on its own, to maintain the portable radio 107 and/or RSM video capture device 108 in a monitor only mode, and which switches the device(s) to a transmit-only mode (for half-duplex devices) or transmit and receive mode (for full-duplex devices) upon depression or activation of the PTT switch 109; however graphic user interfaces provided, for example, at a display screen may also be used to switch between communication modes. The portable radio 107 and/or RSM video capture device 108 may form part of a group communications architecture that allows a single communication device to communicate with one or more group members (i.e., talkgroup members not shown in FIG. 1) associated with a particular group of devices at a same time.

Additional features may be provided at the RSM video capture device 108 as well. For example, as depicted, the display screen 110 may be provided for displaying images, video, and/or text to the user 101 or to someone else. The display screen 110 may be, for example, a liquid crystal display (LCD) screen or an organic light emitting display (OLED) display screen, and the like. In some embodiments, a touch sensitive input interface may be incorporated into the display screen 110 as well, allowing the user 101 to interact with content provided on the display screen 110. However, the display screen 110 may be optional. A soft PTT input may also be provided, for example, via such a touch interface.

The video camera 114 may also be provided at the RSM video capture device 108, integrating an ability to capture images and/or video and store the captured image data (for further analysis) or transmit the captured image data as an image or video stream to the portable radio 107 and/or to other communication devices or to the infrastructure RAN 152 directly. The video camera 114 and RSM remote microphone 115 may be used, for example, for capturing audio and/or video of a field-of-view associated with the user 101, storing the captured image and/or audio data for further analysis or transmitting the captured audio and/or video data as an audio and/or vide stream to the portable radio 107 and/or to other communication devices or to the infrastructure RAN 152 directly for further analysis. The microphone 115 of the RSM video capture device 108 may be an omni-directional or unidirectional microphone or array of omni-directional or unidirectional microphones that may configured for identifying a direction from which a captured sound emanated.

In some embodiments, the RSM video capture device 108 may be replaced with a more limited body worn camera that may include the video camera 114 and/or microphone 115 noted above for capturing audio and/or video, but may forego one or more of the features noted above that transform the body worn camera into a more full featured RSM, such as the separate physical PTT switch 109 and the display screen 110, remote microphone functionality for voice communications in cooperation with portable radio 107, and remote speaker.

The laptop 116, which may be embodied in a tablet device, in particular, may be any wireless communication device used for infrastructure RAN or direct-mode media communication via a long-range or short-range wireless transmitter with other communication devices and/or the infrastructure RAN 152. The laptop 116 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, an incident support application, an incident management application, a computer aided dispatch application, a records management system application and/or other types of applications that may require user interaction to operate. The laptop 116 display screen may be, for example, an LCD screen or an OLED display screen, and the like. In some embodiments, a touch sensitive input interface may be incorporated into the display screen as well, allowing the user 101 to interact with content provided on the display screen. A soft PTT input may also be provided, for example, via such a touch interface. However, the laptop 116 may be optional as carrying a laptop during a public safety incident may be challenging for the user 101.

Front and/or rear-facing video cameras (not depicted), as well as one or more microphones) may also be provided at the laptop 116, integrating an ability to capture video and/or audio of the user 101 and surroundings, which may include a field-of-view of the user 101 and/or a suspect and/or a witness and their surroundings, and store and/or otherwise process the captured video and/or audio for further analysis or transmit the captured video and/or audio as a video and/or audio stream to the portable radio 107, other communication devices, and/or the infrastructure RAN 152 for further analysis.

The headphone 120 may comprise an in-ear or over-the ear earpiece and may be present for providing audio to the user 101 in a private fashion that is not accessible to other users nearby the user 101. The headphone 120 may be wiredly or wirelessly communicatively coupled to one or both of the RSM video capture device 108 and the portable radio 107, which may be configured to provide audio received from the infrastructure RAN 152 and/or from other users to the user 101 based on a manual configuration of the RSM video capture device 108 or the portable radio 107, or based on some automatic routing mechanism at the one of the RSM video capture device 108 and the portable radio 107 that may route all audio to the earpiece or headphone 120 whenever it is detected as connected to the one of the RSM video capture device 108 and the portable radio 107, or may selectively route audio received at the one of the RSM video capture device 108 and the portable radio 107 to the earpiece or headphone 120 based on various contextual parameters, such as a content of the received audio, an identity of who sent the received audio, a covert status of the user 101, an incident status of the user 101, a determination of nearby users associated with the user 101, or some other contextual parameter.

The smart glasses 117 may include a digital imaging device, an electronic processor, a short-range and/or long-range transceiver device, and/or a projecting device and/or one or more microphones. The smart glasses 117 may maintain a bi-directional connection with the portable radio 107 and provide an always-on or on-demand video feed pointed in a direction of a gaze of the user 101 via the digital imaging device, and/or may provide a personal display via the projection device integrated into the smart glasses 117 for displaying information such as text, images, or video received from the portable radio 107 or directly from the infrastructure RAN 152. In some embodiments, the smart glasses 117 may include its own long-range transceiver and may communicate with other communication devices and/or with the infrastructure RAN 152 or vehicular transceiver 137 directly without passing through portable radio 107. In other embodiments, an additional user interface mechanism such as a touch interface or gesture detection mechanism may be provided at the smart glasses 117 that allows the user 101 to interact with the display elements displayed on the smart glasses 117 or projected into the eyes of the user 101, or to modify operation of the digital imaging device. In still other embodiments, a display and input interface at the portable radio 107 may be provided for interacting with smart glasses 117 content and modifying operation of the digital imaging device, among other possibilities.

The smart glasses 117 may provide a virtual reality interface in which a computer-simulated reality electronically replicates an environment with which the user 101 may interact. In some embodiments, the smart glasses 117 may provide an augmented reality interface and/or enhanced reality interface in which a direct or indirect view of real-world environments in which the user is currently disposed are augmented (i.e., supplemented, by additional computer-generated sensory input such as sound, video, images, graphics, GPS data, or other information). In still other embodiments, the smart glasses 117 may provide a mixed reality interface in which electronically generated objects are inserted in a direct or indirect view of real-world environments in a manner such that they may co-exist and interact in real time with the real-world environment and real-world objects.

The sensor-enabled holster 118 may be an active (powered) or passive (non-powered) sensor that maintains and/or provides state information regarding a weapon or other item normally disposed within the sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 107 via its short-range transceiver. In some embodiments, the sensor-enabled holster 118 may also detect whether the first responder's hand is resting on the weapon even if it has not yet been removed from the holster and provide such information to portable radio 107. Other possibilities exist as well.

The biometric sensor wristband 119 may be an electronic device for tracking an activity of the user 101 health of the user 101 and/or a health contextual condition of the user 101, and may include one or more movement sensors (such as an accelerometer, magnetometer, and/or gyroscope) that may periodically or intermittently provide to the portable radio 107 indications of orientation, direction, steps, acceleration, and/or speed, and indications of health such as one or more of a captured heart rate, a captured breathing rate, and a captured body temperature of the user 101, which may accompany other information. In some embodiments, the biometric sensor wristband 119 may include its own long-range transceiver and may communicate with other communication devices and/or with the infrastructure RAN 152 or vehicular transceiver 137 directly without passing through portable radio 107.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 119 itself, or disposed separately and communicate with the sensor wristband 119 via a short-range wireless or wired connection. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short-range wireless connection, among other possibilities.

Although the biometric sensor wristband 119 is shown in FIG. 1 as a bracelet worn around the wrist, in other examples, the biometric sensor wristband 119 may additionally and/or alternatively be worn around another part of the body, or may take a different physical form including an earring, a finger ring, a necklace, a glove, a belt, or some other type of wearable, ingestible, or insertable form factor.

The portable radio 107 and/or RSM video capture device 108 (or any other electronic device in FIG. 1, for that matter) may each include a location determination device integrated with or separately disposed in the portable radio 107 and/or RSM video capture device 108 and/or in respective receivers, transmitters, or transceivers of the portable radio 107 and RSM video capture device 108 for determining a location of the portable radio 107 and RSM video capture device 108. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 101 may include the mobile communication device 133, the vehicular video camera 134 and/or microphone 135, and the vehicular transceiver 137, all of which may be coupled to one another via a wired and/or wireless VAN 138 (and/or with any other further sensors physically or communicatively coupled to the vehicle 132). The vehicular transceiver 137 may include a long-range transceiver for directly wirelessly communicating with communication devices such as the portable radio 107, the RSM video capture device 108, and the laptop 116 via wireless link(s) 142 and/or for wirelessly communicating with the RAN via wireless link(s) 144. The vehicular transceiver 137 may further include a short-range wireless transceiver or wired transceiver for communicatively coupling between the mobile communication device 133 and/or the vehicular video camera 134 and/or the microphone 135 in the VAN 138. The mobile communication device 133 may, in some embodiments, include the vehicular transceiver 137 and/or the vehicular video camera 134 and/or the microphone 135 integrated therewith, and may operate to store and/or process video and/or audio produced by the video camera 134 and/or transmit the captured video and/or audio as a video and/or audio stream to the portable radio 107, other communication devices, and/or an infrastructure RAN 152 (described below) for further analysis. The microphone 135 may comprise an omni-directional or unidirectional microphone 135, or an array thereof, may be integrated in the video camera 134 and/or at the mobile communication device 133 (or additionally or alternatively made available at a separate location of the vehicle 132) and communicably coupled to the mobile communication device 133 and/or vehicular transceiver 137 for capturing audio and storing, processing, and/or transmitting the audio in a same or similar manner as set forth above with respect to the RSM video capture device 108.

Although FIG. 1 illustrates the vehicular video camera 134 and microphone 135 as being placed inside the vehicle 132, in other embodiments, one or both of the vehicular video camera 134 and microphone 135 may be placed at visible or hidden locations outside of the vehicle 132, such as within a vehicular grill portion or bumper portion, or on a roof portion, of the vehicle 132. Further, although FIG. 1 illustrates the speaker 136 as being placed inside of the vehicle 132 and coupled to the mobile communication device 133, in other embodiments, multiple speakers may be provided inside and/or outside of the vehicle 132 (all addressed simultaneously or individually addressable for outputting separate audio streams), or the single speaker 136 may be placed outside of the vehicle and function as a PA (public address) speaker, among other possibilities.

The vehicle 132 may be a human-operable vehicle, or may be a self-driving vehicle operable under control of mobile communication device 133 and optionally in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN 138 and/or the PAN (when the PAN is in range of the VAN 138 or via infrastructure RAN link of the VAN 138).

The vehicle 132 and/or transceiver 137, similar to the portable radio 107 and/or respective receivers, transmitters, or transceivers thereof, may include a location (and/or orientation) determination device integrated with or separately disposed in the mobile communication device 133 and/or transceiver 137 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above may be disposed, and may similarly communicate with the PAN 121 and/or with the infrastructure RAN 152 to support the user 101 in the field.

The VAN 138 may communicatively couple with the PAN 121, disclosed above, when the VAN 138 and the PAN 121 come within wireless transmission range of one another, which may include an authentication that takes place there between. In some embodiments, one of the VAN 138 and the PAN 121 may provide infrastructure communications to the other, depending on the situation and the types of devices in the VAN 138 and/or PAN 121 and may provide interoperability and communication links between devices (such as video cameras and sensors) within the VAN 138 and PAN 121.

The infrastructure RAN 152 comprises a radio access network that provides for radio communication links to be arranged within the network between a plurality of user terminals. Such user terminals may be portable, mobile, or stationary and may include any one or more of the communication devices illustrated in FIG. 1, among other possibilities. At least one other terminal, e.g. used in conjunction with the communication devices, may be a fixed terminal, e.g. a base station, eNodeB, repeater, and/or access point. Such an infrastructure RAN typically includes a system infrastructure that generally includes a network of various fixed terminals, such as antennas and the like, which are in direct radio communication with the communication devices. Each of the fixed terminals operating in the RAN may have one or more transceivers which may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN are made via respective serving fixed terminals. Sites of neighboring fixed terminals may be offset from one another and may provide corresponding non-overlapping or partially or fully overlapping RF coverage areas.

The infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally, or alternatively, the infrastructure RAN 152 may implement a WLAN technology such as Wi-Fi, for example operating in accordance with an IEEE 802.11 standard (e.g., 802.11a, 802.11b, 802.11g) or such as a WiMAX, for example operating in accordance with an IEEE 802.16 standard.

The infrastructure RAN 152 may additionally, or alternatively, operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated as narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using OMA-PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency or frequency & time slot (in which case, in some embodiments, group IDs may be present in the group data to distinguish between groups).

In contrast, a trunked radio system and its communication devices use a pool of traffic channels for virtually an unlimited number of groups of communication devices (and which may also be referred to herein as talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (for example, at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, communication devices may dynamically affiliate with a group (and also disassociate with the group) for example based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1, such a middleware server may be disposed in the infrastructure RAN 152, at the infrastructure controller 156 or at a separate cloud computing cluster (not depicted) communicably coupled to the infrastructure controller 156 via an internet protocol (IP) network (not depicted), among other possibilities.

The infrastructure RAN 152 is illustrated in FIG. 1 as providing coverage for the PAN 121 and/or the portable radio 107, the RSM video capture device 108, the laptop 116, the smart glasses 117, and/or the vehicle transceiver 137 and/or the VAN 138. In general, the infrastructure RAN 152 communicatively couples the PAN 121 and/or the portable radio 107, the RSM video capture device 108, the laptop 116, the smart glasses 117, and/or the vehicle transceiver 137 and/or the VAN 138 to a single infrastructure controller 156, which is in turn in communication with a dispatch computing device 158 which include one or more dispatch terminals operated by one or more dispatchers. The infrastructure controller 156 further couples the PAN 121 and/or the portable radio 107, the RSM video capture device 108, the laptop 116, the smart glasses 117, and/or the vehicle transceiver 137 and/or the VAN 138 to an analytical computing device 162, for example via an internet protocol (IP) network (not depicted), and the like.

For example, infrastructure RAN 152 may include one or more fixed antennas, fixed terminals, and the like (not depicted) which couple the infrastructure RAN 152 to the infrastructure controller 156 (e.g., a radio controller, call controller, PTT server, zone controller, MME, BSC, MSC, site controller, Push-to-Talk controller, or other network device) the dispatch computing device 158 and the analytical computing device 162. In other embodiments, a plurality of fixed antennas and/or terminals and additional controllers may be disposed to support a larger geographic footprint and/or a larger number of mobile devices.

The infrastructure controller 156 illustrated in FIG. 1, or some other back-end infrastructure device or combination of back-end infrastructure devices existing on-premises or in a remote cloud compute cluster accessible via an IP network (such as the Internet), may additionally or alternatively operate as a back-end electronic digital assistant, a back-end audio and/or video processing device, and/or a remote cloud-based storage device consistent with the remainder of this disclosure.

It is assumed in FIG. 1 that an IP network is present which couples the infrastructure controller 156 to the analytical computing device 162, as well as one or more database 163 and/or a media access computing device 169 described in more detail below. Such an IP network may comprise one or more routers, switches, LANs, WLANs, WANs, access points, or other network infrastructure, including but not limited to, the public Internet.

The analytical computing device 162 may comprise of a plurality of computing devices in a cloud compute cluster arrangement, one or more of which may be executing none, all, or a portion of an electronic digital assistant service, sequentially or in parallel, across the one or more computing devices. The one or more computing devices comprising the analytical computing device 162 may be geographically co-located or may be separated by inches, meters, kilometers or miles, and inter-connected via electronic and/or optical interconnects. Although not shown in FIG. 1, one or more proxy servers or load balancing servers may control which one or more computing devices perform any part or all of the electronic digital assistant service.

As depicted, the system 100 may further comprise the one or more databases 163 which may be accessible via an IP network and/or the analytical computing device 162, and may include databases such as a long-term video storage database, a historical or forecasted weather database, an offender database which may include, but is not limited to, facial recognition images to match against, a cartographic database of streets and elevations, a traffic database of historical or current traffic conditions, or other types of databases including, but not limited to map databases. The one or more databases 163 may further include all or a portion of the databases described herein as being provided at infrastructure controller 156. In some embodiments, the one or more databases 163 may be maintained by third parties (for example, the National Weather Service or a Department of Transportation, respectively). As shown in FIG. 1, the one or more databases 163 may be communicatively coupled with the infrastructure RAN 152 (e.g. via an IP network) to allow communication devices (for example, the portable radio 107, the RSM video capture device 108, the laptop 116, and the mobile communication device 133) to communicate with and retrieve data from the one or more databases 163 via the infrastructure controller 156. In some embodiments, the one or more databases 163 are commercial cloud-based storage devices. In some embodiments, the one or more databases 163 are housed on suitable on-premises database servers. The one or more databases 163 of FIG. 1 are merely examples. In some embodiments, the system 100 additionally or alternatively includes other databases that store different information. In some embodiments, the one or more databases 163 disclosed herein and/or additional or other databases are integrated with, or internal to, the infrastructure controller 156.

In yet further embodiments one or more of the databases 163, and/or portions thereof, may be stored at one or more devices associated with and/or assigned to the user 101 (for example, the portable radio 107, the RSM video capture device 108, the laptop 116, and the mobile communication device 133) and/or one or more of the databases 163 may be stored at one or more of the infrastructure controller 156 and/or the dispatch computing device 158 and/or the analytical computing device 162.

In some embodiments, as depicted, the one or more databases 163 comprise a database storing a knowledge graph 170, described in more detail below with respect to FIG. 4. However, the knowledge graph 170 generally defines relationships between a plurality of POEs of interest, using, for example, a node structure, which each node representing a POE of interest, and lines between nodes representing relationships between the POEs of interest.

Furthermore, one or more of a hub device of the PAN 121 and/or the VAN 138, such as the portable radio 107, the dispatch computing device 158 and the analytical computing device 162 may be authorized to access the one or more databases 163 and update the knowledge graph 170, for example as information about the POEs of interest is updated and/or becomes available. Alternatively, the knowledge graph 170 may be at least partially stored and/or maintained at one or more devices associated with and/or assigned to the user 101 (for example, the portable radio 107, the RSM video capture device 108, the laptop 116, and the mobile communication device 133) and/or the knowledge graph 170 may be at least partially stored and/or maintained at one or more of the infrastructure controller 156 and/or the dispatch computing device 158 and/or the analytical computing device 162.

The knowledge graph 170 may be maintained and/or updated using one or more machine learning algorithms described below.

Although the RSM video capture device 108, the laptop 116, and the vehicle 132 are illustrated in FIG. 1 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

For example, as depicted, the system 100 further comprises the media access computing device 169 that may be a component of the analytical computing device 162 and/or the dispatch computing device and/or a component of the cloud compute cluster arrangement of the analytical computing device 162 and/or a standalone computing device. Either way, the media access computing device 169 is in communication with the analytical computing device 162 and/or the devices of the PAN 121 and/or the VAN 138, for example via an IP network.

The media access computing device 169 is further configured to communicate with at least one camera 173 (e.g. a closed-circuit television (CCTV) camera, a video camera, and the like) at the location of the user 101, as well as at least one optional microphone 175 and/or an optional speaker 176, which may also be edge devices. The optional microphone 175 and/or the optional speaker 176 may be components of the at least one camera 173 (e.g. as depicted) and/or may be separate from the at least one camera 173. Furthermore, the at least one camera 173 (and/or the microphone 175 and/or the speaker 176) may be a component of a public safety monitoring system and/or may be a component of a commercial monitoring and/or private security system to which the computing device 169 has been provided access. The camera 173 and/or the microphone 175 generally generate one or more of video data, audio data and multimedia data associated with the location of the user 101; for example, the camera 173 may be positioned to generate video data of the location of the user 101, and the microphone 175 may be positioned to generate audio data of the location of the user 101, such as voices of the user 101 and/or others at the location. Such video data and/or audio data may be used to update the knowledge graph 170.

Although FIG. 1 describes a communication system 100 generally as a public safety communication system that includes a user 101 generally described as a police officer and a vehicle 132 generally described as a police car or cruiser, in other embodiments, the communication system 100 may additionally or alternatively be a retail communication system including a user that may be an employee of a retailer and a vehicle 132 that may be a vehicle for use by the user 101 in furtherance of the employee's retail duties (e.g., a shuttle or self-balancing scooter). In other embodiments, the communication system 100 may additionally or alternatively be a warehouse communication system including a user 101 that may be an employee of a warehouse and a vehicle 132 that may be a vehicle for use by the user 101 in furtherance of the employee's retail duties (e.g., a forklift). In still further embodiments, the communication system 100 may additionally or alternatively be a private security communication system including a user 101 that may be an employee of a private security company and a vehicle 132 that may be a vehicle for use by the user 101 in furtherance of the private security employee's duties (e.g., a private security vehicle or motorcycle). In even further embodiments, the communication system 100 may additionally or alternatively be a medical communication system including a user 101 that may be a doctor or nurse of a hospital and a vehicle 132 that may be a vehicle for use by the user 101 in furtherance of the doctor or nurse's duties (e.g., a medical gurney or ambulance). In still another example embodiment, the communication system 100 may additionally or alternatively be a heavy machinery communication system including a user 101 that may be a miner, driller, or extractor at a mine, oil field, or precious metal or gem field and a vehicle 132 that may be a vehicle for use by the user 101 in furtherance of the miner, driller, or extractor's duties (e.g., an excavator, bulldozer, crane, front loader). As one other example, the communication system 100 may additionally or alternatively be a transportation logistics communication system including a user 101 that may be a bus driver or semi-truck driver at a school or transportation company and a vehicle 132 that may be a vehicle for use by the user 101 in furtherance of the driver's duties.

In the examples of the user 101 being other than a police officer, certain sensors such as the weapon status sensor described above with respect to the police officer user may be replaced or supplemented with other types of sensors, such as one or more sensors that may detect whether a particular retail, warehouse, private security, heavy machinery operator, transportation driver, or other type of user has equipment necessary to perform a particular assigned or to-be-assigned task, whether such equipment is in a workable or sufficient condition, or whether the equipment is sufficient for the area or environment the user is in. Other possibilities and other variations exist as well.

One or more devices of the system 100 may be generally configured to update and/or maintain the knowledge graph 170 using video data and/or audio data and/or multimedia data received from one or more of the video camera 114, the microphone 115, the laptop 116, the smart glasses 117, the video camera 134, the microphone 135, the at least one camera 173 and/or the microphone 175.

Alternatively, one or more devices of the system 100 may be generally configured to update and/or maintain the knowledge graph 170 using data that is captured and/or called into and/or stored in the databases 163 by the user 101 and/or a dispatcher of the dispatch computing device 158, for example, in incident reports and/or work reports and/or shift reports, and the like.

Alternatively, one or more devices of the system 100 may be generally configured to update and/or maintain the knowledge graph 170 based on explicit information (e.g. time of day, observed locations of POEs of interest, and the like) and/or derived information (e.g. predicted locations of POEs, predicted relationships between POEs derived from descriptive information of POEs and/or work reports, and the like).

Such maintaining and/or updating of the knowledge graph 170 may be performed using one or more machine learning algorithms which may include, but are not limited to: a generalized linear regression algorithm; a random forest algorithm; a support vector machine algorithm; a gradient boosting regression algorithm; a decision tree algorithm; a generalized additive model; neural network algorithms, deep learning algorithms, evolutionary programming algorithms, and the like.

However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments.

Figure 2:
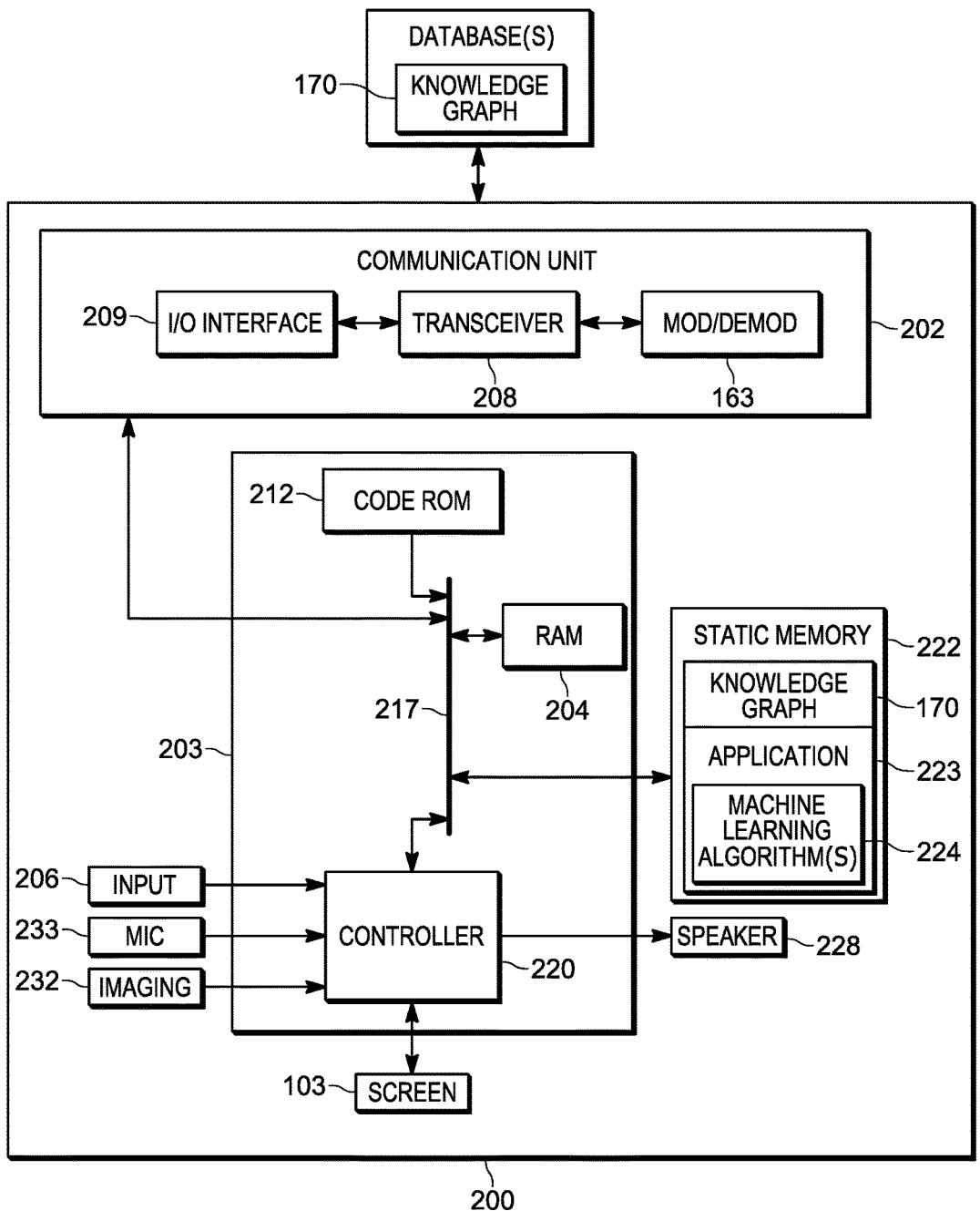
FIG. 2 is a device diagram showing a device structure of a computing device for controlling a display screen using a knowledge graph in accordance with some embodiments.

Attention is next directed to FIG. 2 which sets forth a schematic diagram that illustrates an example device 200. One or more of the devices assigned to the user 101, such as the portable radio 107 and/or the video capture device 108 and/or the laptop 116 and/or the smart glasses 117 and/or the mobile communication device 133 of the vehicle 132, may have a configuration similar to the device 200. Similarly, one or more of the infrastructure controller 156, the dispatch computing device 158, the analytical computing device 162 and/or the media access computing device 169 may have a configuration similar to the device 200.

As depicted in FIG. 2, the example device 200 generally includes a communications unit 202, a processing unit 203, a Random-Access Memory (RAM) 204, the display screen 103, an input device 206, one or more wireless transceivers 208, one or more wired and/or wireless input/output (I/O) interfaces 209, a combined modulator/demodulator 210, a code Read Only Memory (ROM) 212, a common data and address bus 217, a controller 220, a static memory 222 storing an application 223, which may include one or more machine learning algorithms 224, a speaker 228, an imaging device 232 and a microphone 233.

As another example, in some embodiments, the device 200 may further include a location determination device (for example, a global positioning system (GPS) receiver) and the like. Other combinations are possible as well.

However, while the device 200 is described with respect to including certain components, it is understood that the device 200 may be configured according to the functionality of a specific device. For example, when the portable radio 107 and/or the video capture device 108 and/or the laptop 116 and/or the smart glasses 117 and/or the mobile communication device 133 of the vehicle 132, has a configuration similar to the device 200, one or more of the display screen 103, the imaging device 232, the microphone 233 and/or other media components associated with the device 200 may be external to the device 200 and communicatively coupled thereto.

Alternatively, when the infrastructure controller 156, the dispatch computing device 158, the analytical computing device 162 and/or the media access computing device 169, has a configuration similar to the device 200, one or more of the display screen 103, the input device 206, the imaging device 232, the microphone 233 and/or other media components associated with the device 200 may not be present at the device 200 and/or may be external to the device 200 and communicatively coupled thereto.

Furthermore, the device 200 may be communicatively coupled to other devices for example in the personal area network 121 and/or the vehicle area network 138 of FIG. 1.

As depicted, the static memory 222 further stores the knowledge graph 170; alternatively, as also depicted, the device 200 may access the knowledge graph 170 stored at the one or more databases 163. Indeed, the knowledge graph 170 may be downloaded to the static memory 222 from the one or more databases 163 and/or the device 200 may maintain and/or access the knowledge graph 170 at one or more of the static memory 222 and the databases 163. Alternatively, when the device 200 is embodied in one or more of the portable radio 107 and/or the video capture device 108 and/or the laptop 116 and/or the smart glasses 117 and/or the mobile communication device 133 of the vehicle 132, the static memory 222 may store only a subset of the knowledge graph 170 and the remainder of the knowledge graph 170 may be stored at one or more of the infrastructure controller 156, the dispatch computing device 158, the analytical computing device 162, the media access computing device 169 and/or the one or more databases 163; such a subset of the knowledge graph 170 may be downloaded to, and/or updated at, one or more of the portable radio 107 and/or the video capture device 108 and/or the laptop 116 and/or the smart glasses 117 and/or the mobile communication device 133 based, for example on user activity, user location, and the like. Either way, knowledge graph 170 is generally accessible to the controller 220.

The example device 200 is described hereafter in further detail. As shown in FIG. 2, the device 200 includes the communications unit 202 coupled to the common data and address bus 217 of the processing unit 203. The device 200 may also include one or more input devices 206 (e.g., keypad, pointing device, touch-sensitive surface, etc.) and the display screen 103 (which, in some embodiments, may be a touch screen and thus also act as an input device 206), each coupled to be in communication with the processing unit 203.

The speaker 228 may be present for reproducing audio that is decoded from voice or audio streams of calls received via the communications unit 202 from other portable radios, from digital audio stored at the device 200, from other ad-hoc or direct mode devices, and/or from an infrastructure RAN device, or may playback alert tones or other types of pre-recorded audio.

The imaging device 232 may provide video (still or moving images) of an area in a field-of-view of the device 200 for further processing by the processing unit 203 and/or for further transmission by the communications unit 202.

The microphone 233 may be present for capturing audio from a user and/or other environmental or background audio that is further processed by the processing unit 203 and/or is transmitted as voice or audio stream data, or as acoustical environment indications, by the communications unit 202 to other portable radios and/or other communication devices.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory (RAM) 204 and a static memory 222.

The communications unit 202 may include one or more wired and/or wireless input/output (I/O) interfaces 209 that are configurable to communicate with other communication devices and/or computing devices, such as the dispatch computing device 158 and/or the analytical computing device 162.

For example, the communications unit 202 may include one or more wireless transceivers 208, such as a digital mobile radio (DMR) transceiver, a Project 25 (P25) transceiver, a Bluetooth transceiver, a Wi-Fi transceiver, for example operating in accordance with an IEEE 802.11 standard (e.g., 802.11a, 802.11b, 802.11g), an LTE transceiver, a WiMAX transceiver, for example operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to the display screen 103, the input device 206, the imaging device 232, the speaker 228 and/or the microphone 233.

The controller 220 includes one or more logic circuits, one or more processors, one or more microprocessors, one or more ASIC (application-specific integrated circuits) and one or more FPGA (field-programmable gate arrays), and/or another electronic device. In some embodiments, the controller 220 and/or the device 200 is not a generic controller and/or a generic device, but a device specifically configured to implement functionality for controlling a display screen using a knowledge graph 170. For example, in some embodiments, the device 200 and/or the controller 220 specifically comprises a computer executable engine configured to implement specific functionality for controlling a display screen using a knowledge graph 170.

The static memory 222 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 2, programming instructions (e.g., machine readable instructions) that implement the functional teachings of the device 200 as described herein are maintained, persistently, at the memory 222 and used by the controller 220 which makes appropriate utilization of volatile storage during the execution of such programming instructions.

In particular, the memory 222 stores instructions corresponding to the application 223 that, when executed by the controller 220, enables the controller 220 to implement functionality for controlling a display screen using a knowledge graph 170. In illustrated examples, when the controller 220 executes the application 223, the controller 220 is enabled to: receive a work assignment associated with the display screen 103; select one or more field-of-view POEs of interest, from a plurality of POEs of interest, that are related to the work assignment and are located in a field-of-view of the display screen 103; extract, from the knowledge graph 170: associated relationships between the one or more field-of-view POEs of interest; associated relationships between the one or more field-of-view POEs of interest and one or more out-of-field-of-view POEs of interest, the one or more out-of-field-of-view POEs of interest selected from the plurality of POEs of interest, are related to the work assignment, and are located out of the field-of-view of the display screen 103; generate a graphical representation including: a first indication of the one or more field-of-view POEs of interest; a second indication of the associated relationships between the one or more field-of-view POEs of interest; a third indication of the one or more out-of-field-of-view POEs of interest; and a fourth indication of the associated relationships between the one or more field-of-view POEs of interest and the one or more out-of-field-of-view POEs of interest; and render, at the display screen 103, the graphical representation within the field-of-view of the display screen 103.

Furthermore, the application 223 generally includes the one or more machine learning algorithms 224 which may include audio analytic algorithms and/or video analytic algorithms. The one or more machine learning algorithms 224 may include, but are not limited to: a generalized linear regression algorithm; a random forest algorithm; a support vector machine algorithm; a gradient boosting regression algorithm; a decision tree algorithm; a generalized additive model; neural network algorithms, deep learning algorithms, evolutionary programming algorithms, and the like.

However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments The one or more machine learning algorithms 224 may be used to identify POEs of interest in images rendered at the display screen 103 and/or in images acquired by the imaging device 232. In other words, the imaging device 232 may comprise a front facing camera such that a field-of-view of the imaging device 232 is generally coincident with a field-of-view of the display screen 103. Hence, hereafter the term field-of-view of the display screen 103 is understood to include the field-of-view of the imaging device 232, presuming they are generally coincident.

For example, a person may be present in images rendered at the display screen 103 and/or in images acquired by the imaging device 232, and the person may correspond to one of the nodes of the knowledge graph 170; hence, the person may be referred to as a field-of-view POEs of interest as the person is located in a field-of-view of the display screen 103. The node of the knowledge graph 170 that corresponds to the person may include an image of the person, and the one or more machine learning algorithms 224 may utilize facial recognition and/or video analytics to "recognize" the person in the images rendered at the display screen 103 and/or in images acquired by the imaging device 232. Hence, in particular, the one or more machine learning algorithms 224 may be used to identify POEs of interest, in images rendered at the display screen 103 and/or in images acquired by the imaging device 232, that correspond with nodes of the knowledge graph.

Similarly, the one or more machine learning algorithms 224 may be used to recognize other types of field-of-view POEs of interest in such images, that correspond to nodes of the knowledge graph 170, including, but not limited to, buildings, vehicles, businesses and the like. Furthermore, the one or more machine learning algorithms 224 may utilize one or more map databases to determine a location of a building and/or business and the like in such images, assuming, for example, that the one or more machine learning algorithms 224 has access to a location of the device 200 and/or a direction in which the device 200 is facing (e.g. with respect to the field-of-view of the display screen 103 and/or the imaging device 232).

Similarly, the one or more machine learning algorithms 224 may be used to determine locations of out-of-field-of-view POEs of interest that correspond to nodes of the knowledge graph 170, relative to the field-of-view of the display screen 103 and/or edges of the field-of-view of the display screen 103.

The controller 220 generally controls the display screen 103 to provide indications of the various POEs of interest, as well as indications of relationships therebetween.

Figure 3:
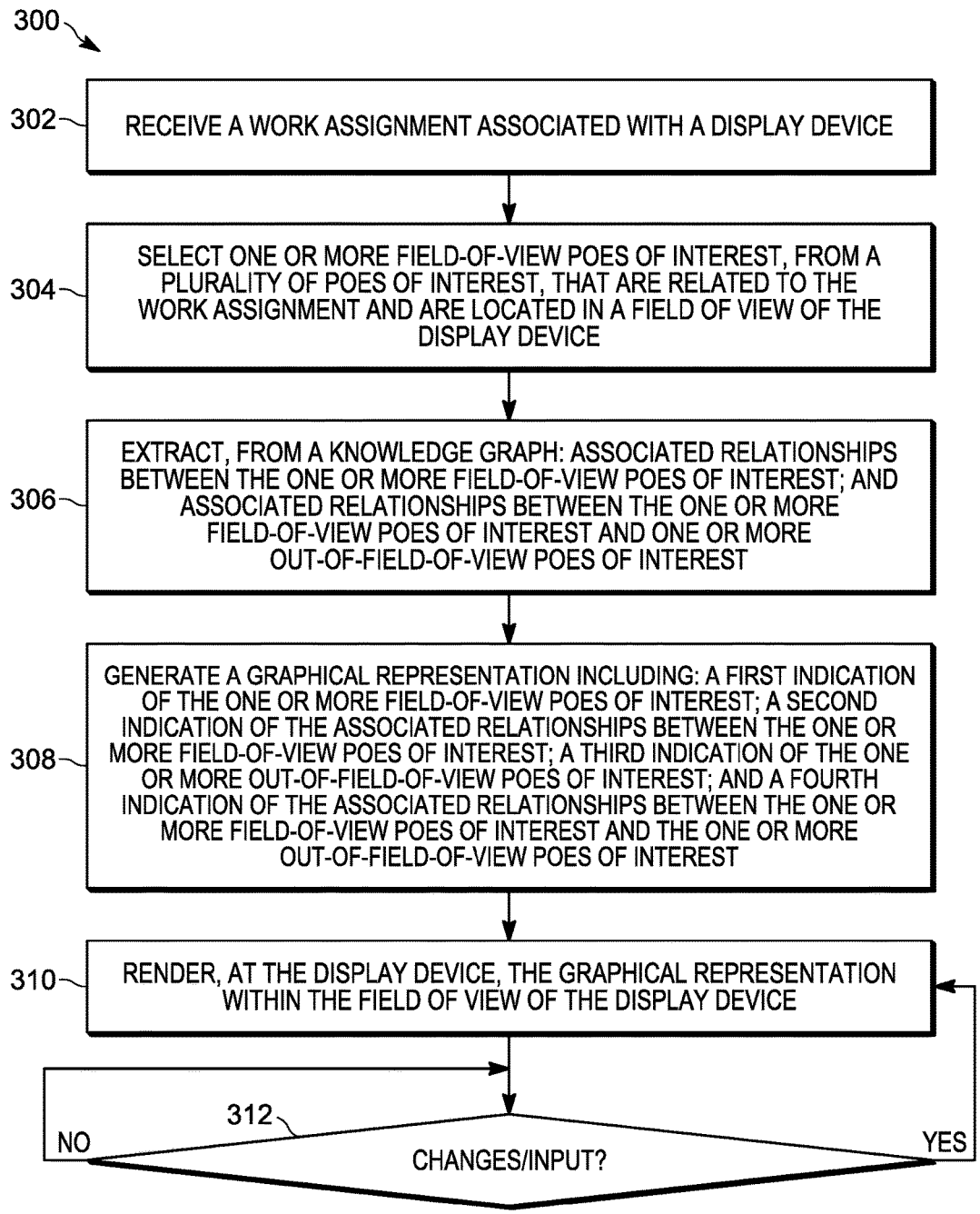
FIG. 3 is a flowchart of a method for managing access authorizations of devices in accordance with some embodiments.

Attention is now directed to FIG. 3, which depicts a flowchart representative of a method 300 for controlling a display screen using a knowledge graph 170. The operations of the method 300 of FIG. 3 correspond to machine-readable instructions that are executed by, for example, the device 200, and specifically by the controller 220 of the device 200. In the illustrated example, the instructions represented by the blocks of FIG. 3 are stored at the memory 222 for example, as the application 223. The method 300 of FIG. 3 is one way in which the controller 220 and/or the device 200 and/or the system 100 is configured. Furthermore, the following discussion of the method 300 of FIG. 3 will lead to a further understanding of the system 100, and its various components. However, it is to be understood that the method 300 and/or the system 100 may be varied, and need not work exactly as discussed herein in conjunction with each other, and that such variations are within the scope of present embodiments.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

Furthermore, while it is assumed hereafter that the method 300 is performed at the device 200, the method 300 may be performed at one or more of the devices of the system 100, for example at the device 200 and/or a combination of one or more of at least one of the devices of the PAN 121 and/or the VAN 138, the infrastructure controller 156, the dispatch computing device 158, the analytical computing device 162, the media access computing device 169, etc.

At a block 302, the controller 220 receives a work assignment associated with the display screen 103. For example, such a work assignment may be received and/or generated by the dispatch computing device 158, and may include one or more of an incident assignment (e.g. for a first responder assigned to a public safety incident), a shift assignment, and the like.

At a block 304, the controller 220 selects one or more field-of-view POEs of interest, from a plurality of POEs of interest, that are related to the work assignment and are located in a field-of-view of the display screen 103. For example, the controller 220 may access the knowledge graph 170 to identify a plurality of POEs of interest which correspond to nodes of the knowledge graph 170 and, using data stored in association with the nodes, and the one or more machine learning algorithms 224, select POEs of interest that are located in a field-of-view of the display screen 103.

At a block 306, the controller 220 extracts, from the knowledge graph 170: associated relationships between the one or more field-of-view POEs of interest; associated relationships between the one or more field-of-view POEs of interest and one or more out-of-field-of-view POEs of interest, the one or more out-of-field-of-view POEs of interest selected from the plurality of POEs of interest, are related to the work assignment, and are located out of the field-of-view of the display screen 103.

The associated relationships are generally stored in the knowledge graph 170, as described below with respect to FIG. 4, which may be visually represented as lines between nodes, but the relationships may be stored in any suitable manner.

Further, out-of-field-of-view POEs of interest are POEs of interest that correspond to nodes in the knowledge graph 170 but that are not located in a field-of-view of the display screen 103 and/or the imaging device 232.

At a block 308, the controller 220 generate a graphical representation including:

A first indication of the one or more field-of-view POEs of interest.

A second indication of the associated relationships between the one or more field-of-view POEs of interest.

A third indication of the one or more out-of-field-of-view POEs of interest.

A fourth indication of the associated relationships between the one or more field-of-view POEs of interest and the one or more out-of-field-of-view POEs of interest.

Each of the indications of the graphical representation may be represented in a manner that textually and/or graphically distinguishes them from each other.

Furthermore, first indications of different types of field-of-view POEs of interest may be represented in a manner that textually and/or graphically distinguish them from each other; for example, field-of-view POEs of interest corresponding to people may be textually and/or graphically distinguishable from field-of-view POEs of interest corresponding to buildings.

Similarly, third indications of different types of out-of-field-of-view POEs of interest may be represented in a manner that textually and/or graphically distinguishes them from each other; for example, out-of-field-of-view POEs of interest corresponding to people may be textually and/or graphically distinguishable from out-of-field-of-view POEs of interest corresponding to buildings.

Similarly, each of the first indication of the one or more field-of-view POEs of interest and the third indication of the one or more out-of-field-of-view POEs of interest may include a respective indication of context information related to a respective POEs of interest. For example, an indication of field-of-view POE of interest and/or an out-of-field-of-view POE of interest may include a name of respective person and/or building, and/or an indication of out-of-field-of-view POE of interest may include a distance to the out-of-field-of-view POE of interest (e.g. from the device 200). However, any textual and/or graphical indication of such contextual information is within the scope of the present specification.

Similarly, the third indication of the one or more out-of-field-of-view POEs of interest may include a respective indication of whether a respective out-of-field-of-view POEs of interest has previously been in the field-of-view of the display screen 103. Hence, for example, an out-of-field-of-view POEs of interest that has previously been in the field-of-view of the display screen 103 may be a different color and the like from another out-of-field-of-view POEs of interest that has not previously been in the field-of-view of the display screen 103. However, any textual and/or graphical indication of whether a respective out-of-field-of-view POEs of interest has previously been in the field-of-view of the display screen 103 is within the scope of the present specification, including, but not limited to, icons.

At a block 310, the controller 220 renders, at the display screen 103, the graphical representation within the field-of-view of the display screen 103.

At a block 312, as changes occur in the system 100 (e.g. a "YES" decision at the block 312), and/or input is received at an input device, the controller 220 may dynamically update the graphical representation by repeating at least the block 310. Otherwise (e.g. a "NO" decision at the block 312), the controller 220 may wait until changes occur in the system 100 to dynamically update the graphical representation (e.g. the block 312 is repeated until changes occur in the system 100). Such changes may include, but are not limited to, one or more of: the knowledge graph 170 changes; the field-of-view of the display screen 103 changes; the associated relationships in the knowledge graph 170 change; information associated with the work assignment changes; and the like.

Alternatively, input may be received at the controller 220 from an input device (e.g. the input device 206), the controller 220 communicatively coupled to the input device, and the controller 220 may dynamically update the graphical representation based on such input (e.g. that identifies a POE for example).

Put another way, the controller 220 may be further configured to: dynamically update the graphical representation as one or more of: the field-of-view of the display screen 103 changes; the associated relationships change; as information associated with the work assignment changes; and input is received at the controller 220 from an input device, the controller 220 communicatively coupled to the input device.

For example, any such changes and/or input may cause the knowledge graph 170 to be updated which may cause the graphical representation to be updated. Put another way, the controller 220 may be further configured to: dynamically update the graphical representation as the knowledge graph 170 changes.

While the method 300 is described with respect to the knowledge graph 170, in some embodiments the method 300 may be implemented using a subset of the knowledge graph 170. For example, when the device 200 is embodied in one more of the portable radio 107 and/or the video capture device 108 and/or the laptop 116 and/or the smart glasses 117 and/or the mobile communication device 133 of the vehicle 132, the static memory 222 may store only a subset the knowledge graph 170, and the method 300 may be implemented with the subset of the knowledge graph 170. Alternatively, references to the knowledge graph in the discussion of the method 300, and throughout the specification, may be understood by a person of skill in the art to be a subset of the knowledge graph. For example, the device 200 may implement the method 300 with a knowledge graph that comprises a subset of a larger version of the knowledge graph stored, for example, at the one or more databases 163, and the like; updates, and the like, to the knowledge graph stored at the device 200 may be uploaded, by the device 200, to the larger knowledge graph stored at the one or more databases 163, and the like. Indeed, as described below, the device 200 may store only a subset of the knowledge graph 170, update the subset and upload only the updated changes to the subset of the knowledge graph 170 to the one or more databased 163.

Example embodiments of the method 300 will now be described with respect to FIG. 4 to FIG. 10.

Figure 4:
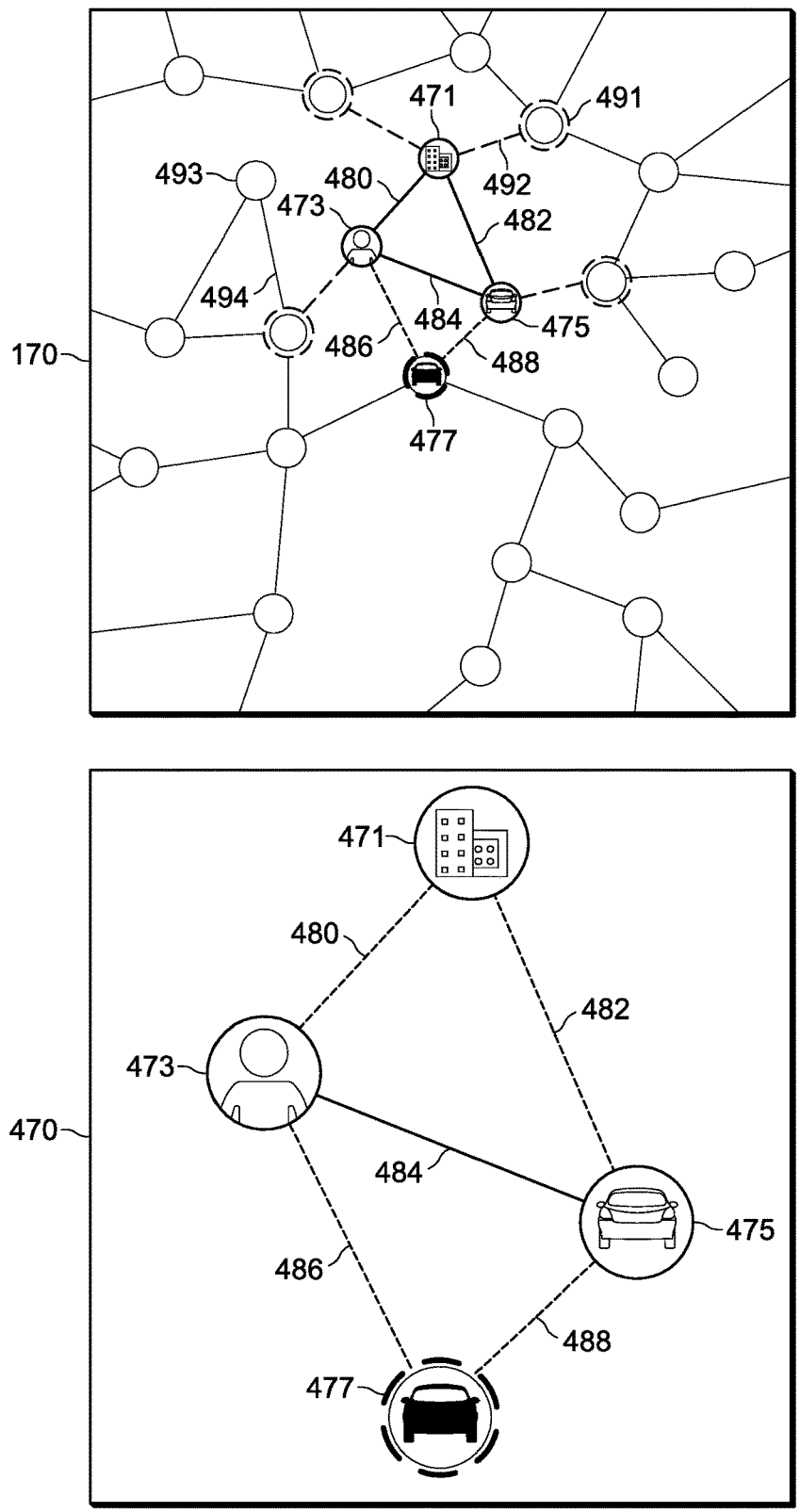
FIG. 4 is an example knowledge graph in accordance with some embodiments.

Attention is next directed to FIG. 4 which depicts an example embodiment of the knowledge graph 170 as well as a subset 470 of the knowledge graph 170 which shows details of the knowledge graph 170 that will be used to describe example embodiments. In some embodiments, the knowledge graph 170 may be stored at the one or more databases 163 while the subset 470 of the knowledge graph 170 may be stored at one or more of the portable radio 107 and/or the video capture device 108 and/or the laptop 116 and/or the smart glasses 117 and/or the mobile communication device 133 of the vehicle 132.

The knowledge graph 170 includes a plurality of nodes, each corresponding to a POE of interest. While the knowledge graph 170, and the subset 470, are depicted herein with icons and/or graphics representing nodes, as described hereafter, such icons and/or graphics are provided for clarity and may not be represented in the knowledge graph 170, and the subset 470 until the knowledge graph 170, and the subset 470 are explicitly rendered at a display screen, For example, as depicted, a node 471 corresponds to a building of interest, for example at which a crime has occurred and which may be associated with a work assignment. The node 471 graphically represents building (e.g. via an icon of a building). Furthermore, data that identifies the building may be stored in association with the node 471, including, but not limited to, one or more images of the building, a location of the building, entities and/r business entities located in the building, and the like.

The node 473 corresponds to a person of interest, for example a witness to the crime. The node 473 graphically represents a person (e.g. via an icon of a person). Furthermore, data that identifies the person may be stored in association with the node 473, including, but not limited to, one or more images of the person, an address of the person, a description of the person, and the like.

The node 475 corresponds to a vehicle of interest, for example a type of vehicle that the witness to the crime reported as leaving the scene of the crime, for example a white van. The node 475 graphically represents a vehicle (e.g. via an icon of a vehicle). Furthermore, data that identifies the vehicle on may be stored in association with the node 475, including, but not limited to, an image of the vehicle, a description of the vehicle, a license plate number, a description of a reported driver of the vehicle, registration information associated with the vehicle and the like.

The node 477 is similar to the node 475 and represents another vehicle of interest, for example another white van. As depicted, the nodes 475, 477 are graphically distinguishable from each other in the knowledge graph 170; for example, the node 475 is circled by a solid line while the node 477 is circled by a broken line. As will be described in more detail below, such a graphic distinction may distinguish nodes that correspond to field-of-view POEs of interest from nodes that correspond to out-of-field-of-view POEs of interest. For example, the node 475 may correspond to white van that is currently in field-of-view of the display screen 103 while the node 477 may correspond to a white van that is currently out of the field-of-view of the display screen 103.

The locations of the white vans may be reported by different users and/or first responders to the dispatch computing device 158, which may update the knowledge graph 170 accordingly. For example, when the crime occurs and it is determined that a white van was reported at the scene of the crime, an all-points bulletin (APB) and/or be-on-the-lookout (BOLO) may be transmitted to police officers in the region of the crime; police officers may hence report locations of white vans to the dispatch computing device 158 which may update the knowledge graph 170 accordingly.

The knowledge graph 170 hence includes relationships between nodes represented in FIG. 4 as lines between the nodes. For example, solid lines 480, 482, 484 between the nodes 471, 473, 477 in FIG. 4 represent relationships between nodes that correspond to field-of-view POEs of interest, while dashed lines 486, 488 between the nodes 473, 475 and the node 477 represent relationships between nodes that correspond to field-of-view POEs of interest and a node that corresponds to an out-of-field-of-view POE of interest.

For example, as the node 471 represents a building that is a scene of a crime, the node 473 represents a witness to the crime and the nodes 475, 477 represent vehicles that may be associated with the crime, lines 480, 482, 484, 486, 488 therebetween are provided in the knowledge graph 170 to represent such relationships. Put another way, the nodes 471, 473, 475, 477 are all associated with a work assignment and the lines 480, 482, 484, 486, 488 are provided to show relationships between the nodes 471, 473, 475, 477 associated with the work assignment. Furthermore, the lines 480, 482, 484 are solid lines representing relationships between nodes 471, 473, 475 corresponding to field-of-view POEs of interest, while the lines 486, 488 are broken, representing relationships between nodes 473, 475, corresponding to field-of-view POEs of interest, and the node 477 corresponding to an out-of-field-of-view POE of interest.

The various nodes, relationships, and the corresponding graphical representation thereof, may be updated as the field-of-view of the display screen 103 changes and/or as more information is gathered about the crime which may be used to add nodes to the knowledge graph 170 and/or to add lines/relationships. For example, lines and/or nodes may change from broken to solid and vice versa as corresponding POEs of interest change between field-of-view POEs of interest and out-of-field-of-view POEs of interest The knowledge graph 170 further includes other types of nodes, such as nodes 491 that correspond to POEs that may not be associated with the work assignment (e.g. the crime) but have relationships with nodes 471, 473, 475, 477 that are associated with the work assignment. For example, a node 491 may correspond to a vehicle of a business at the building represented by the node 471, but that does not match a description of vehicle associated with the crime.

The nodes 491 may be graphically represented in a manner different from the nodes 471, 473, 475, 477, for example as a different color and/or, as depicted, with a different style of broken lines, and the like. Similarly, such relationships are represented by lines 492 which are graphically represented in a manner different from the lines 480, 482, 484, 486, 488, for example as a different color and/or, as depicted, with a different style of broken lines, and the like.

The knowledge graph 170 further includes other types of nodes, such as nodes 493 that correspond to POEs that are not associated with the work assignment (e.g. the crime) and which do not have relationships with nodes 471, 473, 475, 477. Put another way, the nodes 493 are at least twice removed from the nodes 471, 473, 475, 477 in the knowledge graph 170.

The nodes 493 may be graphically represented in a manner different from the nodes 471, 473, 475, 477, 491 for example as a different color and/or, as depicted, with different graphics (e.g. as empty circles), and the like. Similarly, such relationships are represented by lines 494 which are graphically represented in a manner different from the lines 480, 482, 484, 486, 488, 492 for example as a different color and/or, as depicted, with a different style of broken lines, and the like.

Other types of graphical representations of nodes and/or relationships are within the scope of the present specification including, but not limited to, nodes that represent POEs of interest that are outside or inside the field-of-view of the display screen 103 that have been previously interacted with (as described in more detail below) or not previously interacted with. For example, the node 477 represents a vehicle (e.g. a white van) reported as being associated with the crime (e.g. work assignment) but which the user 101 operating the display screen 103 has not yet seen and/or interacted with. When the user 101 later sees and/or interacts with the vehicle represented by the node 477, the node 477 may one or more of change color, change style of line, change an icon, add an icon, include text and/or graphics indicating same, and the like.

Figure 5:
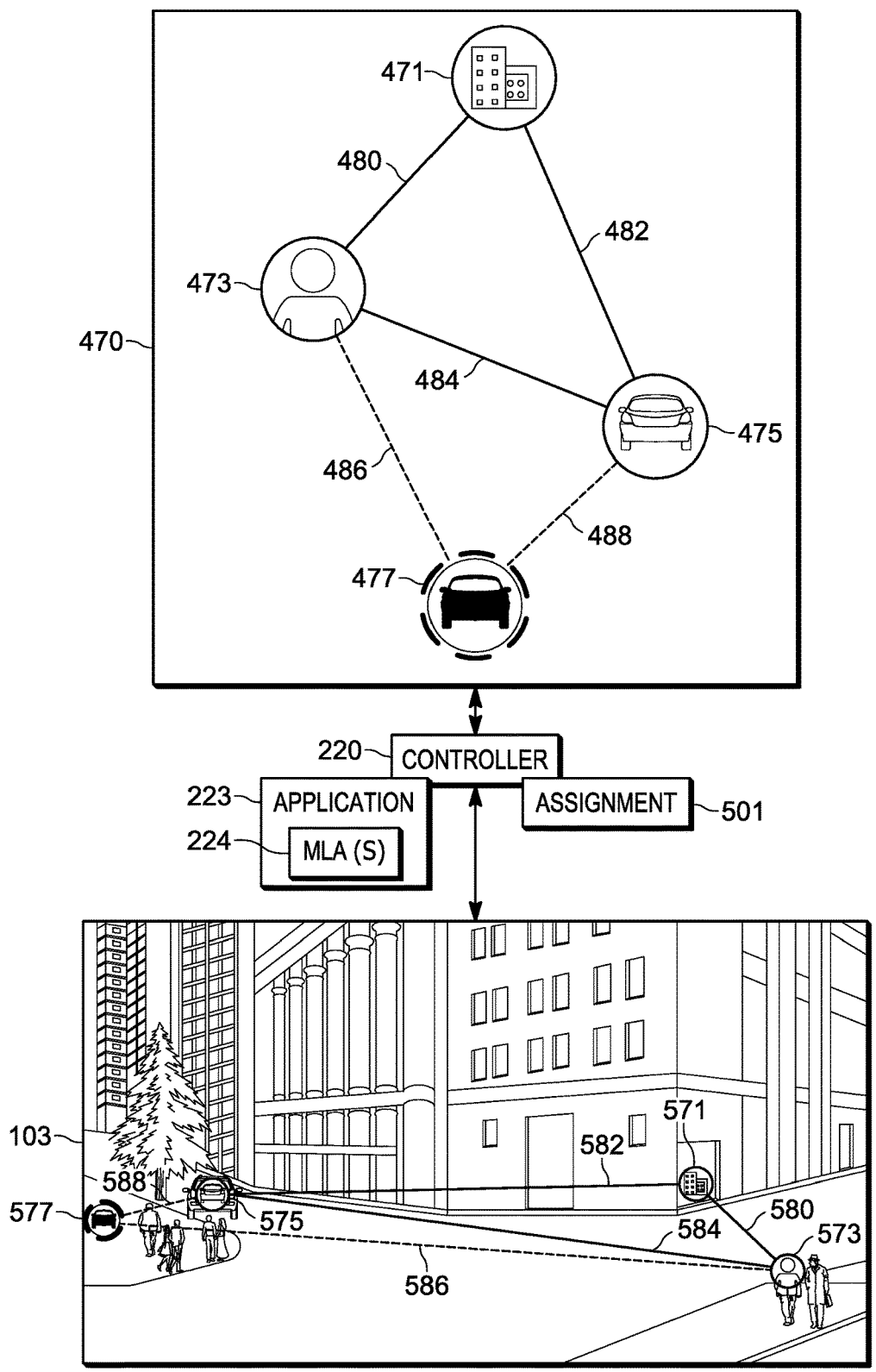
FIG. 5 depicts a controller of the system controlling a display screen to render a graphical representation that includes indications of person-objects-entities of interest that are in a field-of-view of the display screen and out of the field-of-view of the display screen, as well as relationships therebetween, the person-objects-entities of interest being determined using the knowledge graph of FIG. 4, in accordance with some embodiments.

Attention is next directed to FIG. 5 which depicts the display screen 103 under control of the controller 220, the controller 220 having access to the knowledge graph 170 as represented in FIG. 5 by the subset 470 of the knowledge graph 170; for example, the controller 220 may download the subset 470 of the knowledge graph 170 based on a location of the device 200, the subset 470 including nodes that represent field-of-view POEs, as well as any nodes that represent out-of-field-of-view POEs that have relationships with field-of-view POEs. As depicted, the controller 220 is executing the application 223 including, but not limited to, the one or more machine learning algorithms 224 (labelled "MLA(s)" in FIG. 5). In the following discussion the controller 220 may have a "direct" access to only the subset 470 (e.g. as stored in the memory 222), but synchronizes (e.g. using the communication unit) the subset 470 with the knowledge graph 170 as stored at the one or more databases 163 (and the like), as the subset 470 is updated at the device 3200 and/or as the knowledge graph 170 is updated at the one or more databases 163 (and the like)

As depicted, the controller 220 has received a work assignment 501 (e.g. at the block 302 of the method 300) and identified nodes 471, 473, 475, 477 in the knowledge graph 170 and/or the subset 470 of the knowledge graph 170, that are associated with the work assignments 501, as well as relationships therebetween. It is further assumed in FIG. 5 that the crime at the building represented by the node 471 has been reported, that a witness represented by the node 473 has been identified and that locations of white vans represented by the nodes 473, 477 have been determined.

In other words, in FIG. 5, the knowledge graph 170, and specifically the subset 470, has been updated and/or populated with the nodes 471, 473, 475, 477 and the relationships therebetween as the crime associated with the work assignment 501 is investigated and/or as data related to the crime associated with the work assignment 501 is gathered and uploaded to the databases 163 and the like.

As depicted, the display screen 103 shows a field-of-view of the display screen 103 which may include images acquired by the imaging device 232 and/or a real-world scene viewable through a transparent display screen 103, for example at a location of the user 101. In either embodiment, however, the imaging device 232 captures images that correspond to the real-world scene and in particular an incident scene, for example associated with a crime and the like.

Either way, the controller 220 (e.g. at the block 304 of the method 300) selects one or more field-of-view POEs of interest, from the plurality of POEs of interest (e.g. represented by the nodes 471, 473, 475) that are related to the work assignment and are located in a field-of-view of the display screen 103. For example, the controller 220 may compare images from the imaging device 232 with data associated with the nodes 471, 473, 475, 477 to determine which of the nodes 471, 473, 475, 477 represent POEs of interest that are located in the field-of-view of the display screen 103 and which of the nodes 471, 473, 475, 477 represent POEs of interest that are not located in the field-of-view of the display screen 103. Such a determination may occur using the one or more machine learning algorithms 224 to compare, for example, images of persons and/or buildings and/or vehicles in the images with data associated with the of the nodes 471, 473, 475, 477.

Hence, as depicted, the controller 220 may determine that the nodes 471, 473, 475 represent field-of-view POEs of interest while the node 477 represents an out-of-field-view POE of interest.

Hence, the controller 220 extracts (e.g. at the block 306 of the method 300), from the knowledge graph 170, and/or the subset 470 of the knowledge graph 170, associated relationships between the one or more field-of-view POEs of interest. In particular, the controller 220 determines that the nodes 471, 473, 475 are related via the lines 480, 482, 484. In other words, the controller 220 identifies the one or more field-of-view POEs of interest and corresponding nodes that represent the one or more field-of-view POEs of interest, and determines relationships between the one or more field-of-view POEs of interest via relationships (e.g. lines) between the corresponding nodes.

Similarly, the controller 220 further extracts (e.g. at the block 306 of the method 300), from the knowledge graph 170, and/or the subset 470 of the knowledge graph 170, associated relationships between the one or more field-of-view POEs of interest and one or more out-of-field-of-view POEs of interest, the one or more out-of-field-of-view POEs of interest selected from the plurality of POEs of interest, are related to the work assignment 501, and are located out of the field-of-view of the display screen 103.

Hence, for example, the controller 220 determines that the node 477 represents on out-of-field-of-view POE and that the lines 486, 488 relate the node 477, respectively, to the nodes 473, 475.

The controller 220 generates (e.g. at the block 308 of the method 300) a graphical representation of the identified one or more field-of-view POEs of interest and any identified one or more out-of-field-of-view POEs of interest and the relationships extracted from the knowledge graph 170, and/or the subset 470 of the knowledge graph 170, and renders (e.g. at the block 310 of the method 300) the graphical representation at the display screen 103.

For example, as depicted, controller 220 is controlling the display screen 103 to render a first indication of the one or more field-of-view POEs of interest which includes: an icon 571 at the building which corresponds to the node 471; an icon 573 at the person which corresponds to the node 473; and an icon 575 at the vehicle which corresponds to the node 475. Hence, in FIG. 5, the controller 220 has identified the building, the person and the vehicle of the nodes 471, 473, 475 in the field-of-view of the display screen 103 and rendered the corresponding icons 571, 573, 575 at each.

Similarly, as depicted, controller 220 is controlling the display screen 103 to render a second indication of the associated relationships between the one or more field-of-view POEs of interest, which includes: a line 580 between the icons 571, 573, which corresponds to the line 480 between the nodes 471, 473; a line 582 between the icons 571, 575, which corresponds to the line 482 between the nodes 471, 475; and a line 584 between the icons 573, 575, which corresponds to the line 484 between the nodes 473, 475.

Similarly, as depicted, controller 220 is controlling the display screen 103 to render a third indication of the one or more out-of-field-of-view POEs of interest which includes: an icon 577 which corresponds to the node 477. Hence, in FIG. 5, the controller 220 has identified a location of the vehicle of the node 477 in and rendered the icon 577 at a location at an edge of the display screen 103 that corresponds to a direction in which the corresponding vehicle is located. The icon 577 may hence provide an indication of a location of another vehicle associated with the work assignment 501 (e.g. the crime) relative to the incident scene in the field-of-view of the display screen 103. Such embodiments assume that the controller 220 has access to the location of the vehicle represented by the icon 577 as well as a direction and location of the field-of-view of the display screen 103. Hence, for example, as the icon 577 is on the left side of the display screen 103, when the display screen 103 is moved and/or rotated left, the corresponding vehicle may appear in the field-of-view of the display screen 103.

Similarly, as depicted, controller 220 is controlling the display screen 103 to render a fourth indication of the associated relationships between the one or more field-of-view POEs of interest and the one or more out-of-field-of-view POEs of interest, which includes: a line 586 between the icons 573, 577, which corresponds to the line 486 between the nodes 473, 475; and a line 588 between the icons 575, 577, which corresponds to the line 488 between the nodes 475, 477.

The graphical representation of the block 308 of the method 300 hence may include, but is not limited to, the icons 571, 573, 575, 577 and the lines 580, 582, 584, 586, 588.

Figure 6:
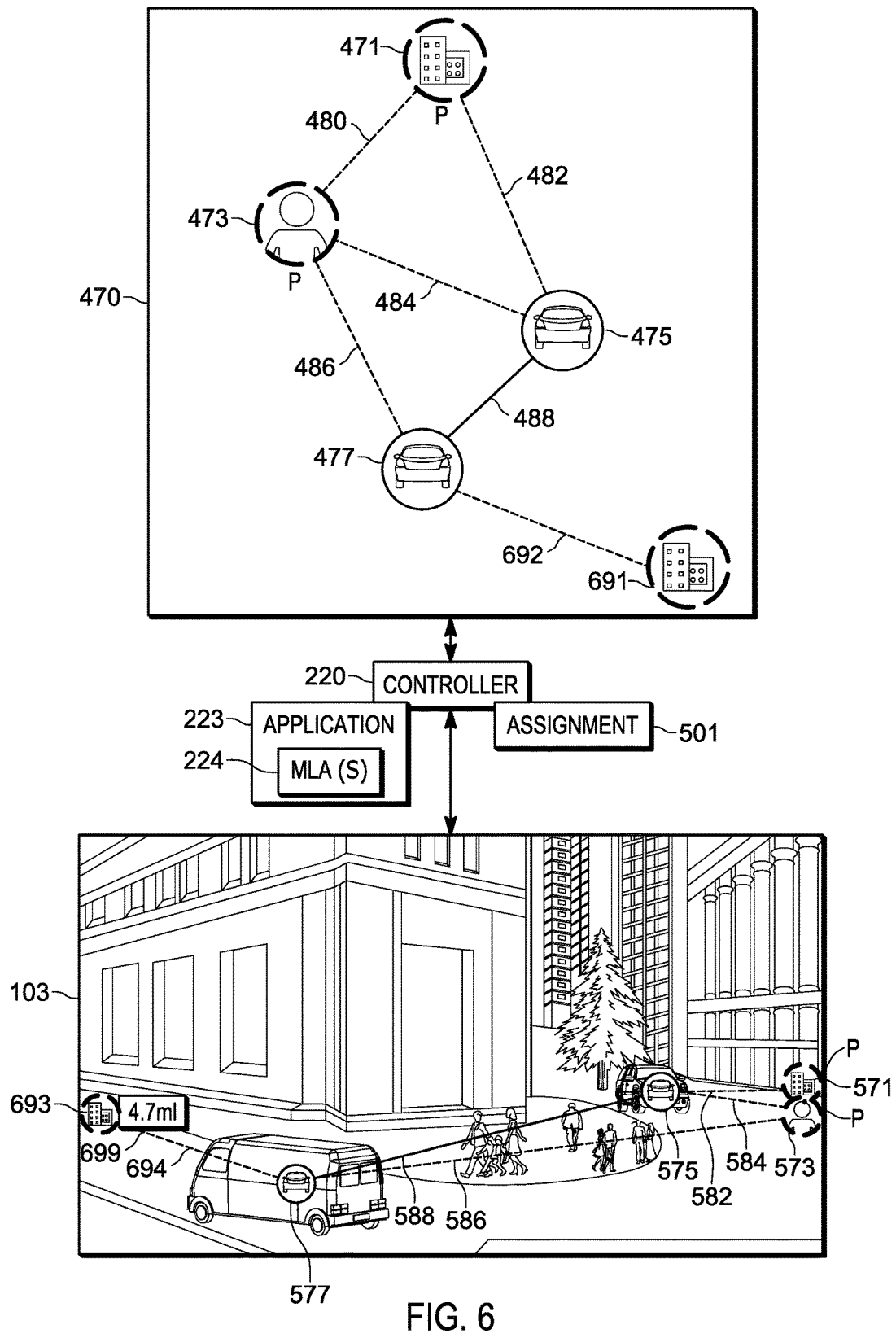
FIG. 6 depicts the controller controlling the display screen to render another graphical representation that includes indications of person-objects-entities of interest that are in a field-of-view of the display screen and out of the field-of-view of the display screen, as well as relationships therebetween, as the display screen moves in accordance with some embodiments.

Attention is next directed to FIG. 6 which is substantially similar to FIG. 5, with like elements having like numbers. However, in FIG. 6, the display screen 103, and the field-of-view of the display screen 103, has been moved and/or rotated to the left (e.g. towards the icon 577) relative to FIG. 5, for example by way of the user 101 moving and/or rotating the display screen 103 in a direction of the icon 577.

Hence, another real-world scene of the location at which the user 101 is located is provided at the display screen 103. Such movement and/or rotation may result in POEs of interest that were field-of-view POEs of interest in FIG. 5 changing to out-of-field-of-view POEs of interest; similarly, such movement and/or rotation may result in POEs of interest that were out-of-field-of-view POEs of interest in FIG. 5 changing to field-of-view POEs of interest. The nodes and lines of the knowledge graph 170, and/or the subset 470 of the knowledge graph 170, may be updated accordingly, as may the corresponding icons and lines of the graphical representation rendered at the display screen 103.

For example, it is assumed in FIG. 6 that the POEs of interest (e.g. the person and the building) corresponding to the nodes 471, 473 and the icons 571, 573 are now located out of the field-of-view of the display screen 103, and hence circles around the nodes 471, 473 have changed from solid lines to broken lines similar to the broken lines of the node 477 in FIG. 5.

Furthermore, as the POEs of interest (e.g. the person and the building) corresponding to the nodes 471, 473 were previously located in the field-of-view of the display screen 103, and/or previously interacted with, the nodes 471, 473 now include an icon "P" to indicate such (e.g. "P" indicating previously viewed). Alternatively, the nodes 471, 473 may change color, and the like, to indicate that they represent POEs of interest that are presently out of the field-of-view of the display screen 103, but were previously in the field-of-view of the display screen 103.

Similarly, the icons 571, 573 are updated at the display screen 103 to indicate that they now represent out-of-field-of-view POEs of interest. As such the icons 571, 573 are now circled by broken lines and further include an icon "P". The icons 571, 573 are located at a right edge of the display screen 103 to indicate directions that the corresponding POEs of interest are located. The line 580 between the icons 571, 573 is removed as their relative off-display-screen locations are such that the icons 571, 573 overlap.

In contrast, it is further assumed in FIG. 6 that the POE of interest corresponding to the node 477 and the icon 577 (e.g. a white van) is now in the field-of-view of the display screen 103, hence a circle around the node 477 has changed to from a broken line to a solid line similar to the solid lines of the nodes 471, 43 in FIG. 5. Similarly, the icon 575 is moved to be located at the position of the corresponding white van, and the icon 577 (also circled by a solid line) is now located at the display screen 103 at the position of the second white van. In other words, the controller 220 has located the white van corresponding to the node 477 in the field-of-view of the display screen 103 and rendered the icon 577 thereupon.

Lines 582, 584, 586, 588 are further updated to indicate whether the relationships between icons at the display screen 103 are between field-of-view POEs or between a field-of-view POE and an out-of-field-of-view POE. Hence, lines 582, 584 have changed from solid lines to broken lines, and the line 588 has changed from a broken line to a solid line. The line 586 remains broken as while the icon 577 now corresponds to a field-of-view POE of interest, the icon 573 now corresponds to an out-of-field-of-view POE of interest.

Furthermore, in FIG. 6, the subset 470 of the knowledge graph 170, and/or the subset 470 of the knowledge graph 170, has been updated to include a node 691 that corresponds to a business that owns the vehicle represented by the node 477; for example, a police officer may contact the business that owns the vehicle represented by the node 477 and learns that they frequently make deliveries in the neighborhood where the crime happened (e.g. the present location of the user 101), and that another one of their white vans has been reported stolen. The node 691 may include a location of the business, for example geographic coordinates and/or an address of a building where the business is located.

One or more machine learning algorithms at a device of the system 100 (e.g. the dispatch computing device 158) may hence update the knowledge graph 170, and/or the subset 470 of the knowledge graph 170, based on probable evidence; in particular, the business may be added to the knowledge graph 170, and/or the subset 470 of the knowledge graph 170, as the node 691, and a relationship between the business represented by the node 691 and the vehicle represented by the node 477 is represented by a line 692. However, the white vans represented by the nodes 475, 477 may or may not be the stolen white van and/or the white van that was involved in the crime; the lines representing the relationships between the nodes corresponding to the white vans and the other nodes are merely meant to represent possible connections to the crime.

Furthermore, it is assumed that the business represented by the node 691 is located out of the field-of-view of the display screen 103 and is hence graphically represented in a manner similar to the node 477 as depicted in FIG. 5.

The controller 220 repeats at least the block 306 of the method 300 and extracts, from the updated knowledge graph 170, and/or the updated subset 470 of the knowledge graph 170, associated relationships between the one or more field-of-view POEs of interest and one or more out-of-field-of-view POEs of interest, including the business corresponding to the node 691. The controller 220 also updates the display screen 103 to include an icon 693 corresponding to the node 691, for example at an edge of the display screen 103 that represents a direction of the associated business, along with a line 694 between the icons 577, 693, that corresponds to the line 692 between the nodes 477, 691.

As depicted, the icon 693 further includes a respective indication of context information related to a respective POEs of interest, and in particular an indication 699 that indicates a distance (e.g. 4.7 miles) from the user 101 and/or the display screen 103 to the associated business. The distance may be determined from the location of the business stored in association with the node 691 and a current location of the device 200 (e.g. as determined using a GPS receiver and the like). Other respective indications of context information may also be provided at the indication 699 including, but not limited to, a time to drive and/or walk to the business, a name of the business, text descriptive of the relationship with the white van associated with the icon 577 (e.g. "This business owns the white van"), and the like.

In yet further embodiments, a geofence may be determined around the incident scene (e.g. a given distance and/or a given driving distance and/or a given walking distance, and the like) and a distance to a distance from the user 101 and/or the display screen 103 to an out-of-field-of-view POE of interest may be provided at an associated icon when the out-of-field-of-view POE of interest is outside the geofence. Hence, the icon 693 includes the indication 699 indicating a distance as it is assumed that the associated out-of-field-of-view POE of interest is outside a geofence, while the icons 571, 573 do not include an indication of distance as it is assumed that the associated out-of-field-of-view POEs of interest are inside the geofence. Such embodiments further assume that locations of each of the POEs of interest associated with the icons 571, 573, 693 are known and/or have been determined.

Figure 7:
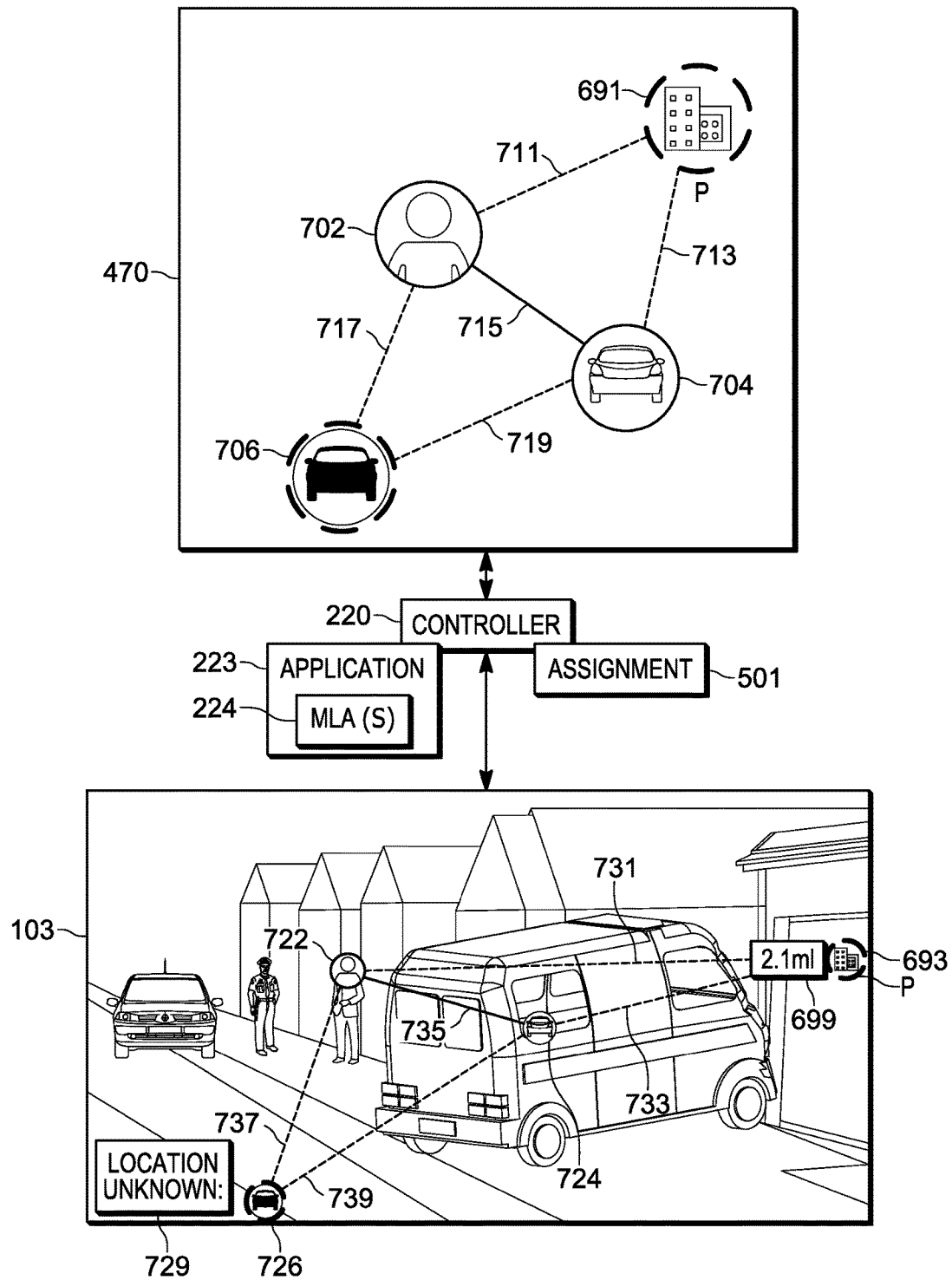
FIG. 7 depicts the controller controlling the display screen to render another graphical representation that includes indications of person-objects-entities of interest that are in a field-of-view of the display screen and out of the field-of-view of the display screen, as well as relationships therebetween, at a location different from that of FIG. 5 and FIG. 6 in accordance with some embodiments.

Attention is next directed to FIG. 7 which is substantially similar to FIG. 5 and FIG. 6 with like elements having like numbers. However, in FIG. 7, it is assumed that the user 101 visits an incident scene (e.g. with the with the display screen 103) different from the one of FIG. 5 and FIG. 6. However, in other embodiments, another user (e.g. another police officer) with another display screen may be at the different incident scene. Either way, the incident scene of FIG. 7 is associated with the work assignment 501.

For example, later in the day of the crime associated with FIG. 5 and FIG. 6, another witness may report an abandoned white van which matches a description of the white van that was stolen in association with the work assignment 501, and may have been used in the crime. Hence, nodes corresponding to the witness and van are added to the knowledge graph 170, and/or the subset 470 of the knowledge graph 170. For example, as depicted in FIG. 7 in the subset 470 of the knowledge graph 170, a node 702 corresponding to the witness is added and a node 704 corresponding to the reported abandoned white van is added.

In this example scenario, the user 101 (and/or another user, such as another police officer) is dispatched to the location of abandoned white van (e.g. the real-world scene depicted in the display screen 103 in FIG. 7), and at the location the witness tells them that he also saw a yellow car leaving the scene at high speed a short time before he found the white van. As such, a node 706 corresponding to the yellow car is added to the knowledge graph 170, and/or the subset 470 of the knowledge graph 170. It is assumed in the example scenario that the location of the yellow car is unknown.

As depicted, the subset 470 of the knowledge graph 170 depicted in FIG. 7 includes the node 691 corresponding to the business as well as lines 711, 713 between the node 691 and, respectively, the nodes 702, 704. The line 711 represents the relationship between the witness corresponding to the node 702 and the business corresponding to the node 691 by way of the witness reporting the abandoned white van which may or may not be the stolen white van reported by the business; similarly, the line 713 represents the relationship between the abandoned white van corresponding to the node 704 and the business corresponding to the node 691 by way the business reporting a stolen white van. A line 715 between the nodes 702, 704 represents the relationship between the witness and the abandoned white van.

Similarly, a line 717 represents a relationship between the yellow car corresponding to the node 706 and the witness represented by the node 702, and the line 719 represents a relationship between the witness and the yellow car and the white van (e.g. both being seen at the same incident scene). Alternatively, such relationships may be determined based on evidence collected at the incident scene of FIG. 7 that links the abandoned van with the crime of the incident scene of FIG. 5 and FIG. 6. Indeed, in some embodiments, a user at the incident scene of FIG. 7 may cause an alert to be issued for the yellow car (e.g. an APB, a BOLO, and the like).

The nodes 702, 704 are further circled with solid lines, and the nodes 691, 706 are circled with broken lines, respectively indicating whether they correspond to field-of-view POEs of interest or out-of-field-of-view POEs of interest as described below. Similarly, the line 715 is solid and the lines 711, 713, 717, 719 are broken respectively indicating whether they correspond to relationships between field-of-view POEs of interest or relationships between field-of-view POEs and out-of-field-of-view POEs of interest as described below.

Also in FIG. 1, the node 691 is depicted with an icon "P" indicating that the business corresponding to the node 691 has been previously interacted with (e.g. between the time of the crime associated with the incident scene in FIG. 5 and FIG. 6, and the time of visiting the incident scene of FIG. 7, a user associated with the work assignment 501, such as the user 101 and/or another police officer, has spoken with and/or visited the business).

While the nodes 471, 473, 475, 477, and the lines 480, 482, 484, 486, 488, 692 are not depicted in the subset 470 of the knowledge graph 170 in FIG. 7, they are nonetheless assumed to be present.

As also depicted in FIG. 7, the controller 220 extracts: associated relationships between the one or more field-of-view POEs of interest; and associated relationships between the one or more field-of-view POEs of interest and one or more out-of-field-of-view POEs of interest, the one or more out-of-field-of-view POEs of interest selected from the plurality of POEs of interest; and controls the display screen 103 to render a graphical representation of indications of one or more field-of-view POEs of interest, the one or more out-of-field-of-view POEs and relationships therebetween.

For example, as depicted, the controller 220 controls the display screen 103 to render: an icon 722 corresponding to the node 702 at a location of the witness; an icon 724 corresponding to the node 704 at the location of the abandoned white van; the icon 693 at an edge of the display screen 103 in a direction of the business represented by the node 691, with the text of the indication 699 updated to include the present distance to the business; and an icon 726 corresponding to the node 706, as well as an indication 729 that a location of the yellow car is unknown (e.g. the yellow car is assumed to be outside a geofence).

As the location of the yellow car is unknown, the position of the icon 726 may be anywhere along the edge of the display screen 103. However a region of the display screen 103 may be dedicated to POEs of interest having unknown locations; put another way, the indication 729 may indicate such a region.

The controller 220 further controls each of the icons 693, 722, 724, 726 to indicate whether they are associated with field-of-view POEs of interest or out-of-field-of-view POEs of interest, as well as whether the POEs of interest having been interacted with. Hence, the icons 722, 724 are circled by solid lines (indicating field-of-view POEs) while the icons 693, 726 are circled by broken lines (indicating out-of-field-of-view POEs). Similarly, the icon 693 includes the icon "P", similar to the corresponding node 691.

The controller 220 further controls the display screen 103 to render lines 731, 733, 735, 737, 739, respectively corresponding to the lines 711, 711, 715, 717, 719 of the knowledge graph 170, and/or the subset 470 of the knowledge graph 170, with the lines 731, 733, 735, 737, 739 being solid or broken to indicate relationships between field-of-view POEs of interest, or relationships between a field-of-view POE of interest and an out-of-field-of-view POE of interest. Hence, the line 735 between the icons 722, 724 are solid, and the lines 731, 733, 737, 739 are broken.

Figure 8:
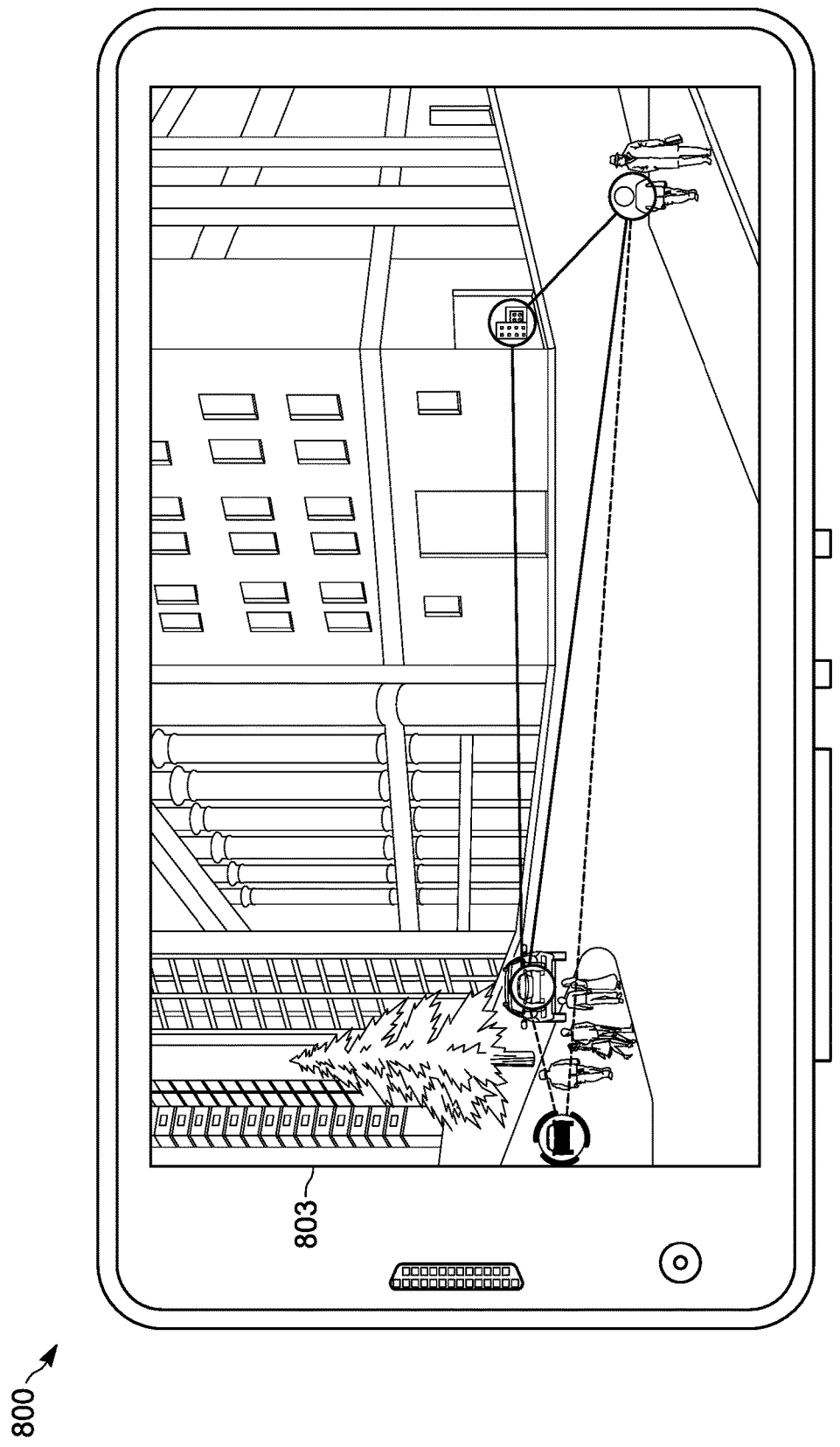
FIG. 8 is an example device that includes a display screen being controlled to overlay, onto a live camera stream, a graphical representation that includes indications of person-objects-entities of interest that are in a field-of-view of the display screen and out of the field-of-view of the display screen, as well as relationships therebetween, in accordance with some embodiments.
Figure 9:
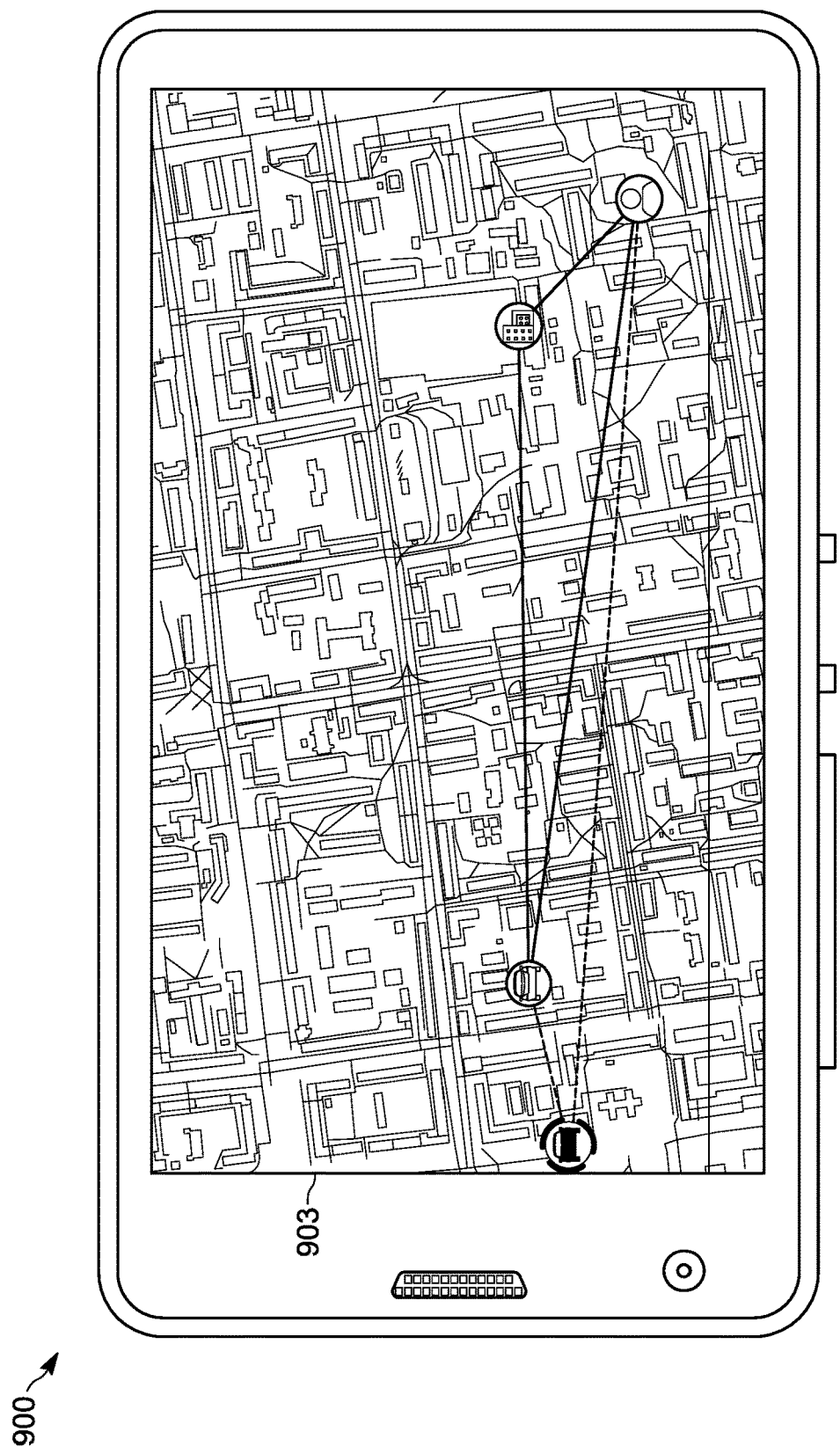
FIG. 9 is an example device that includes a display screen being controlled to overlay, onto a map, a graphical representation that includes indications of person-objects-entities of interest that are in a field-of-view of the display screen and out of the field-of-view of the display screen, as well as relationships therebetween, in accordance with some embodiments.
Figure 10:
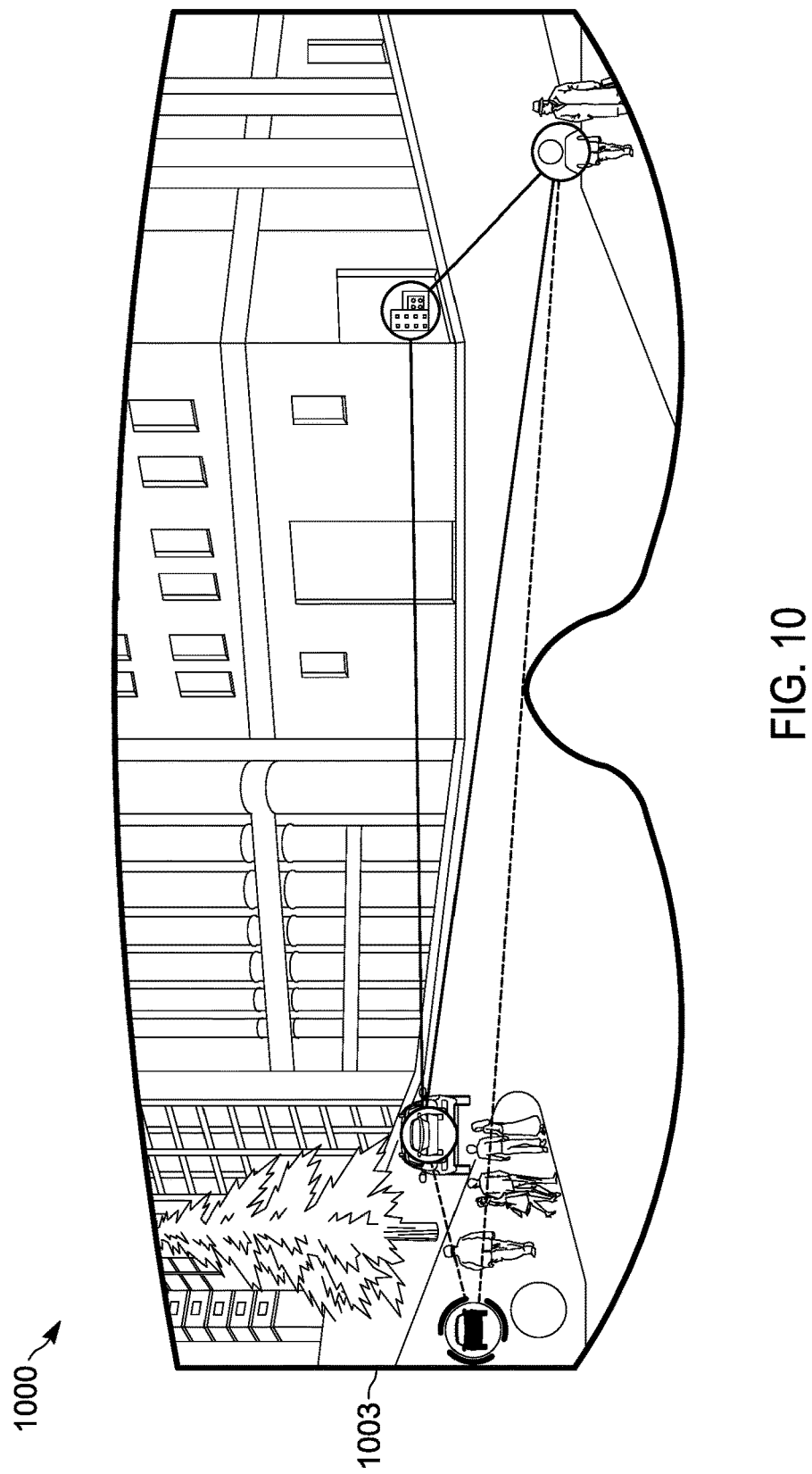
FIG. 10 is an example device that includes a display screen being controlled to overlay, in one or more of an augmented reality, virtual reality and/or enhanced reality and/or mixed reality view, a graphical representation that includes indications of person-objects-entities of interest that are in a field-of-view of the display screen and out of the field-of-view of the display screen, as well as relationships therebetween, in accordance with some embodiments.

Attention is next directed to FIG. 8, FIG. 9 and FIG. 10, each of which depict example implementations of the device 200 and the display screen 103.

For example, attention is next directed to FIG. 8 which depicts a mobile communication device 800, such as the portable radio 107, that includes a display screen 803 rendering the graphical representation of FIG. 5. In other words, in FIG. 8, the device 200 may be embodied by the device 800 and the display screen 103 may be embodied by the display screen 803. As depicted, the graphical representation rendered at the display screen 803 may comprise an image captured by a rear-facing camera, with the icons and lines rendered thereon. Put another way, the display screen 803 is being controlled to overlay the graphical representation of FIG. 5 on a field-of-view of the display screen 803. Furthermore, the images rendered at the display screen 803 may comprise a live camera view of an incident scene and/or the display screen 803 is being controlled to overlay the graphical representation of FIG. 5 on a live camera view.

Put yet another way, the system 100 may comprise an imaging device (such as the imaging device 232) configured to capture images associated with the field-of-view of the display screen 803, and wherein the controller 220 may be further configured to overlay the graphical representation (e.g. of FIG. 5) on the images associated with the field-of-view of the display screen 103.

Attention is next directed to FIG. 9 which depicts a mobile communication device 900, such as the portable radio 107, that includes a display screen 903 rendering a map with the icons and lines of the graphical representation of FIG. 5 being rendered thereupon. In other words, in FIG. 9, the device 200 may be embodied by the device 900 and the display screen 103 may be embodied by the display screen 903. As depicted, the graphical representation is being controlled to overlay the graphical representation of FIG. 5 on map with the icons of the graphical representation of FIG. 5 located at locations of the corresponding POEs of interest on the map. Edges of the map rendered at the display screen 903 may be determined from locations associated with the nodes of the knowledge graph 170, and/or the subset 470 of the knowledge graph 170, that are associated with the work assignment 501.

Attention is next directed to FIG. 10 which depicts smart glasses 1000, such as the smart glasses 117, that includes a display screen 1003 through which a view of a user is depicted. In other words, in FIG. 10, the device 200 may be embodied by the device 1000 and the display screen 103 may be embodied by the display screen 1003. The view may be through the display screen 1003, when the display screen 1003 is transparent, and/or include imagers captured by an imaging device. The view at the display screen 1003 is similar to that depicted in FIG. 5 and FIG. 8, with the graphical representation of FIG. 5 being rendered thereupon. The display screen 1003 may hence comprise a head-mounted and/or a heads-up display screen display screen 1003 providing one or more of an augmented reality, virtual reality and/or enhanced reality and/or mixed reality view.

Hence, provided herein is a system, device and method for controlling a display screen using a knowledge graph. Such control may reduce use of processing resources at a device controlling the display screen by preventing undue movement of the display screen to search for POEs of interest. As the processing of images captured during such movement may be uploaded to another device for processing and/or storage, the system, device and method disclosed herein may further reduce use of bandwidth by reducing the amount of image and/or video data uploaded. Furthermore, use of bandwidth may also be reduced by storing a subset of the knowledge graph at a portable electronic device, and synchronizing subset with the knowledge graph stored at one or more databases in the cloud.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A system comprising:
a memory storing a knowledge graph that defines relationships between a plurality of persons-objects-entities (POEs) of interest using a node structure, the knowledge graph being preconfigured at the memory;
a display screen;
a controller having access to the memory, and the controller communicatively to the display screen, the controller configured to:
receive a work assignment associated with the display screen;
select one or more field-of-view POEs of interest, from the plurality of POEs of interest, that are related to the work assignment and are located in a field-of-view of the display screen;
extract, from the knowledge graph:
associated relationships between the one or more field-of-view POEs of interest;
associated relationships between the one or more field-of-view POEs of interest and one or more out-of-field-of-view POEs of interest, the one or more out-of-field-of-view POEs of interest selected from the plurality of POEs of interest, are related to the work assignment, and are located out of the field-of-view of the display screen;
generate a graphical representation including:
a first indication of the one or more field-of-view POEs of interest;
a second indication of the associated relationships between the one or more field-of-view POEs of interest, the second indication represented as lines between the one or more field-of-view POEs of interest of the first indication;
a third indication of the one or more out-of-field-of-view POEs of interest; and
a fourth indication of the associated relationships between the one or more field-of-view POEs of interest and the one or more out-of-field-of-view POEs of interest, the fourth indication represented as respective lines between the one or more field-of-view POEs of interest and the one or more out-of-field-of-view POEs of interest of the third indication, the lines of the second indication and the respective lines of the fourth indication being of respective styles that are different from one another; and
render, at the display screen, the graphical representation within the field-of-view of the display screen in one or more of an augmented reality view, a virtual reality view, an enhanced reality view and a mixed reality view.

2. The system of claim 1, wherein each of the first indication of the one or more field-of-view POEs of interest and the third indication of the one or more out-of-field-of-view POEs of interest includes a respective indication of context information related to a respective POEs of interest.

3. The system of claim 1, wherein the third indication of the one or more out-of-field-of-view POEs of interest includes a respective indication of whether a respective out-of-field-of-view POEs of interest has previously been in the field-of-view of the display screen.

4. The system of claim 1, wherein the third indication of the one or more out-of-field-of-view POEs of interest includes, when a respective out-of-field-of-view POEs of interest is outside of a geofence associated with the field-of-view of the display screen, an indication of a distance of the respective out-of-field-of-view POEs of interest from the display screen.

5. The system of claim 1, wherein the controller is further configured to:
dynamically update the graphical representation as one or more of: the field-of-view of the display screen changes; the associated relationships change; as information associated with the work assignment changes; and input is received at the controller from an input device, the controller communicatively coupled to the input device.

6. The system of claim 1, wherein the controller is further configured to:
dynamically update the graphical representation as the knowledge graph changes.

7. The system of claim 1, wherein the controller is further configured to:
overlay the graphical representation on one or more of a map, the field-of-view of the display screen and a live camera view of images captures by a rear facing camera.

8. The system of claim 1, further comprising an imaging device configured to capture images associated with the field-of-view of the display screen, and wherein the controller is further configured to overlay the graphical representation on the images associated with the field-of-view of the display screen.

9. The system of claim 1, wherein the display screen comprises one or more of: a mobile communication display screen; and a heads-up display screen and the controller is further configured to:
overlay the graphical representation on one or more of the mobile communication display screen and the heads-up display screen.

10. A method comprising:
receiving, at a controller, a work assignment associated with a display screen;
selecting, at the controller, one or more field-of-view POEs of interest, from the plurality of POEs of interest, that are related to the work assignment and are located in a field-of-view of the display screen, the controller having access to a memory storing at least a subset of a knowledge graph that defines relationships between a plurality of persons-objects-entities (POEs) of interest using a node structure, the at least the subset of the knowledge graph being preconfigured at the memory;
extracting, using the controller, from at least the subset of the knowledge graph:
associated relationships between the one or more field-of-view POEs of interest;
associated relationships between the one or more field-of-view POEs of interest and one or more out-of-field-of-view POEs of interest, the one or more out-of-field-of-view POEs of interest selected from the plurality of POEs of interest, are related to the work assignment, and are located out of the field-of-view of the display screen;
generating, using the controller, a graphical representation including:
a first indication of the one or more field-of-view POEs of interest;
a second indication of the associated relationships between the one or more field-of-view POEs of interest, the second indication represented as lines between the one or more field-of-view POEs of interest of the first indication;
a third indication of the one or more out-of-field-of-view POEs of interest; and a fourth indication of the associated relationships between the one or more field-of-view POEs of interest and the one or more out-of-field-of-view POEs of interest, the fourth indication represented as respective lines between the one or more field-of-view POEs of interest and the one or more out-of-field-of-view POEs of interest of the third indication, the lines of the second indication and the respective lines of the fourth indication being of respective styles that are different from one another; and rendering, using the controller, at the display screen, the graphical representation within the field-of-view of the display screen in one or more of an augmented reality view, a virtual reality view, an enhanced reality view and a mixed reality view.

11. The method of claim 10, wherein each of the first indication of the one or more field-of-view POEs of interest and the third indication of the one or more out-of-field-of-view POEs of interest includes a respective indication of context information related to a respective POEs of interest.

12. The method of claim 10, wherein the third indication of the one or more out-of-field-of-view POEs of interest includes a respective indication of whether a respective out-of-field-of-view POEs of interest has previously been in the field-of-view of the display screen.

13. The method of claim 10, wherein the third indication of the one or more out-of-field-of-view POEs of interest includes, when a respective out-of-field-of-view POEs of interest is outside of a geofence associated with the field-of-view of the display screen, an indication of a distance of the respective out-of-field-of-view POEs of interest from the display screen.

14. The method of claim 10, further comprising:
dynamically updating the graphical representation as one or more of: the field-of-view of the display screen changes; the associated relationships change; as information associated with the work assignment changes; and input is received at the controller from an input device, the controller communicatively coupled to the input device.

15. The method of claim 10, further comprising:
dynamically updating the graphical representation as the knowledge graph changes.

16. The method of claim 10, further comprising:
overlaying the graphical representation on one or more of a map, the field-of-view of the display screen and a live camera view of images captures by a rear facing camera.

17. The method of claim 10, further comprising:
overlaying the graphical representation on images associated with the field-of-view of the display screen, the images captures via an imaging device configured to capture the images associated with the field-of-view of the display screen.

18. The method of claim 10, wherein the display screen comprises one or more of: a mobile communication display screen; and a heads-up display screen, and wherein the method further comprises:
overlaying the graphical representation on one or more of the mobile communication display screen and the heads-up display screen.

19. A device comprising:
a memory storing at least a subset of a knowledge graph that defines relationships between a plurality of persons-objects-entities (POEs) of interest using a node structure, the at least the subset of the knowledge graph being preconfigured at the memory;
a display screen;
a communication unit; and
a controller communicatively coupled to the memory, display screen, and the communication unit, the controller configured to:
receive, via the communication unit, a work assignment associated with the display screen;
select one or more field-of-view POEs of interest, from the plurality of POEs of interest, that are related to the work assignment and are located in a field-of-view of the display screen;
extract, from at least the subset of the knowledge graph:
associated relationships between the one or more field-of-view POEs of interest;
associated relationships between the one or more field-of-view POEs of interest and one or more out-of-field-of-view POEs of interest, the one or more out-of-field-of-view POEs of interest selected from the plurality of POEs of interest, are related to the work assignment, and are located out of the field-of-view of the display screen;
generate a graphical representation including:
a first indication of the one or more field-of-view POEs of interest;
a second indication of the associated relationships between the one or more field-of-view POEs of interest, the second indication represented as lines between the one or more field-of-view POEs of interest of the first indication;
a third indication of the one or more out-of-field-of-view POEs of interest; and
a fourth indication of the associated relationships between the one or more field-of-view POEs of interest and the one or more out-of-field-of-view POEs of interest, the fourth indication represented as respective lines between the one or more field-of-view POEs of interest and the one or more out-of-field-of-view POEs of interest of the third indication, the lines of the second indication and the respective lines of the fourth indication being of respective styles that are different from one another; and
render, at the display screen, the graphical representation within the field-of-view of the display screen in one or more of an augmented reality view, a virtual reality view, an enhanced reality view and a mixed reality view.

20. The device of claim 19, wherein the controller is further configured to:
update the subset of the knowledge graph stored at the memory; and
synchronize, using the communication unit, the subset of the knowledge graph with a version of the knowledge graph stored at one or more databases.

* * * * *